United States Patent
Kotaka et al.

(10) Patent No.: US 7,576,881 B2
(45) Date of Patent: Aug. 18, 2009

(54) FACSIMILE AND INFORMATION PROCESSING APPARATUS

(75) Inventors: Satoshi Kotaka, Nagano (JP); Junya Uchiyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 838 days.

(21) Appl. No.: 10/810,341

(22) Filed: Mar. 26, 2004

(65) Prior Publication Data

US 2005/0002065 A1 Jan. 6, 2005

(30) Foreign Application Priority Data

| Mar. 28, 2003 | (JP) | ............................ P2003-089638 |
| Mar. 28, 2003 | (JP) | ............................ P2003-089639 |
| Dec. 22, 2003 | (JP) | ............................ P2003-424492 |
| Dec. 22, 2003 | (JP) | ............................ P2003-424493 |

(51) Int. Cl.
*G06F 3/12* (2006.01)
*H04N 1/00* (2006.01)
*G06K 15/00* (2006.01)

(52) U.S. Cl. ...................... 358/1.15; 358/400; 358/402; 358/407; 358/440; 358/1.14

(58) Field of Classification Search ................ 358/1.15, 358/1.16, 1.12, 1.1, 1.4, 1.13, 1.14, 407, 358/524, 400, 402, 440; 399/81–85, 77; 709/223–225, 219, 206; 710/8, 72

See application file for complete search history.

(56) References Cited

U.S. PATENT DOCUMENTS

| 6,130,757 | A  | * | 10/2000 | Yoshida et al. ............. 358/1.15 |
| 6,535,702 | B1 | * | 3/2003 | Takatsu ........................ 399/81 |
| 6,567,185 | B1 | * | 5/2003 | Doyle et al. ................ 358/1.16 |
| 6,704,775 | B1 | * | 3/2004 | Sato et al. .................... 709/219 |
| 6,859,832 | B1 | * | 2/2005 | Gecht et al. .................. 709/224 |
| 6,862,104 | B2 | * | 3/2005 | Yajima et al. ............... 358/1.15 |
| 6,982,811 | B2 | * | 1/2006 | Sato ........................... 358/1.4 |

FOREIGN PATENT DOCUMENTS

| JP | 05063883 A | 3/1993 |
| JP | 2000324284 A | 11/2000 |
| JP | 2002142058 A | 5/2002 |
| JP | 2002368926 A | 12/2002 |
| JP | 2003032413 A | 1/2003 |

* cited by examiner

*Primary Examiner*—Edward L Coles
*Assistant Examiner*—Charlotte M Baker
(74) *Attorney, Agent, or Firm*—Hogan & Hartson LLP

(57) ABSTRACT

A facsimile which is capable of executing a plurality of jobs in parallel and which comprises a touch-sensitive screen according to the invention displays the contents of each job in the order of a read job, a facsimile transmission job, a print job, and a facsimile reception job on the touch-sensitive screen (displays the contents of each job without selecting the type of job whose contents are to be displayed).

9 Claims, 23 Drawing Sheets

*FIG. 15*

| DISPLAY RANK | JOB NAME | SPECIFIED VALUE OF DISPLAY ORDER IN A GROUP |
|---|---|---|
| 0 | READ (COPY) | |
| | READ (NETWORK COPY) | |
| | READ (SCAN TO FILE) | |
| | READ (SCAN TO E-MAIL) | |
| | READ (PC DRIVER) | |
| | READ (FACSIMILE) | |
| 1 | TRANSMISSION (FACSIMILE) | 0 (JOB CURRENT ORDER) |
| 2 | PRINT (COPY) | 1 (INVERSE ORDER OF JOB OCCURRENCE) |
| | PRINT (NETWORK COPY) | |
| | PRINT (FILE TO PRINT) | |
| | PRINT (PC DRIVER) | |
| | PRINT (FACSIMILE) | |
| 3 | RECEPTION (FACSIMILE) | — |

FIG. 16

| DISPLAY RANK | JOB NAME | SPECIFIED VALUE OF DISPLAY ORDER IN A GROUP |
|---|---|---|
| 0 | READ (COPY) | |
| | READ (NETWORK COPY) | |
| | READ (SCAN TO FILE) | |
| | READ (SCAN TO E-MAIL) | |
| | READ (PC DRIVER) | |
| | READ (FACSIMILE) | |
| 1 | PRINT (COPY) | 1 (INVERSE ORDER OF JOB OCCURRENCE) |
| | PRINT (NETWORK COPY) | |
| 2 | TRANSMISSION (FACSIMILE) | 0 (JOB CURRENT ORDER) |
| 3 | PRINT (FILE TO PRINT) | 1 (INVERSE ORDER OF JOB OCCURRENCE) |
| | PRINT (PC DRIVER) | |
| | PRINT (FACSIMILE) | |
| 4 | RECEPTION (FACSIMILE) | — |

FIG. 17

| DISPLAY RANK | JOB NAME | SPECIFIED VALUE OF DISPLAY ORDER IN A GROUP |
|---|---|---|
| 0 | READ (COPY) | |
| | READ (NETWORK COPY) | |
| | READ (SCAN TO FILE) | |
| | READ (SCAN TO E-MAIL) | |
| | READ (PC DRIVER) | |
| | READ (FACSIMILE) | |
| 1 | PRINT (COPY) | 1 (INVERSE ORDER OF JOB OCCURRENCE) |
| 2 | PRINT (NETWORK COPY) | 1 (INVERSE ORDER OF JOB OCCURRENCE) |
| 3 | PRINT (FILE TO PRINT) | 1 (INVERSE ORDER OF JOB OCCURRENCE) |
| | PRINT (PC DRIVER) | |
| 4 | TRANSMISSION (FACSIMILE) | 0 (JOB CURRENT ORDER) |
| 5 | PRINT (FACSIMILE) | 1 (INVERSE ORDER OF JOB OCCURRENCE) |
| 6 | RECEPTION (FACSIMILE) | − |

FIG. 18

| DISPLAY RANK | JOB NAME | SPECIFIED VALUE OF DISPLAY ORDER IN A GROUP |
|---|---|---|
| 0 | READ (COPY) | |
| | READ (NETWORK COPY) | |
| | READ (SCAN TO FILE) | |
| | READ (SCAN TO E-MAIL) | |
| | READ (PC DRIVER) | |
| | READ (FACSIMILE) | |
| 1 | PRINT (COPY) | 1 (INVERSE ORDER OF JOB OCCURRENCE) |
| 2 | PRINT (NETWORK COPY) | 1 (INVERSE ORDER OF JOB OCCURRENCE) |
| 3 | PRINT (FILE TO PRINT) | 1 (INVERSE ORDER OF JOB OCCURRENCE) |
| 4 | PRINT (PC DRIVER) | |
| 5 | TRANSMISSION (FACSIMILE) | 0 (JOB CURRENT ORDER) |
| 6 | PRINT (FACSIMILE) | 1 (INVERSE ORDER OF JOB OCCURRENCE) |
| 7 | RECEPTION (FACSIMILE) | − |

FACSIMILE AND INFORMATION PROCESSING APPARATUS

BACKGROUND OF THE INVENTION

The present invention relates to a facsimile and an information processing apparatus capable of executing a plurality of jobs in parallel.

It is a known fact that, many of the recent facsimiles are capable of executing in parallel a read job for generating facsimile data from a manuscript to be transmitted via facsimile, a facsimile transmission job for transmitting facsimile data to a specified facsimile destination, a facsimile reception job for receiving and storing transmitted facsimile data, and a print job for printing facsimile data received and stored by the facsimile reception job, and also queuing facsimile transmission jobs and print jobs. In short, many of the recent facsimiles are capable of reading a facsimile manuscript even when some facsimile data remains untransmitted and receiving facsimile even when some facsimile data remains unprinted.

Such a facsimile, that is, a facsimile capable of executing a plurality of jobs in parallel, is capable of providing a list of simple information (hereinafter referred to as the summary information) on the running jobs and waiting jobs for print jobs and facsimile transmission jobs on a display provided on its housing or console. The facsimile is also capable of providing on the display simple information on the contents (hereinafter referred to as summary information) of a print job or a facsimile transmission job whose summary information has been selected.

In case a user who has checked the detailed information on a job wishes to check the detailed information on another job, the facsimile must first display a list of summary information then select detailed information on the target job.

An information processing apparatus capable of executing various jobs (for example a digital multifunction machine), same as the facsimile, must select the type of a job whose detailed information is to be displayed then select a job whose detailed information is to be displayed.

In short, existing facsimiles and information processing apparatus must carry out relatively cumbersome work in order to check the contents of the running/waiting jobs.

Further, in such a facsimile, that is, a facsimile capable of executing a plurality of jobs in parallel, the user must perform the following operation when wishing to cancel a job.

The user wishing to cancel a job presses a button (hereinafter referred to as the Stop button) provided on the housing of a facsimile (console) for instructing cancellation of a job. With this operation, a list of information on running/waiting jobs appears on a display (typically a touch-sensitive screen) provided on the housing of the facsimile. The user selects a single item of information from the list. When this operation is made, the facsimile provides on the display a screen for making an inquiry to the user about whether to cancel a job corresponding to the selected information. The user performs operation to instruct cancellation of the job on the screen.

In this way, on a related art facsimile capable of executing a plurality of jobs in parallel, the user wishing to cancel a job must perform at least three types of operation. On an information processing apparatus capable of executing various jobs (for example a digital multifunction machine) the user wishing to cancel a job must perform at least three types of operation, same as the related art facsimile.

SUMMARY OF THE INVENTION

The invention has been accomplished in view of the above circumstances and aims at providing a facsimile and an information processing apparatus capable of readily checking the contents of the running/waiting jobs.

In order to solve the aforesaid object, the invention is characterized by having the following arrangement.

(1) A facsimile comprising:
a display unit;
an input unit including a button;
a facsimile control section for executing jobs including:
a read job for generating facsimile data based on a manuscript to be transmitted via facsimile;
a facsimile transmission job for transmitting facsimile data to a specified facsimile destination;
a facsimile reception job for receiving and storing transmitted facsimile data; and
a print job for printing facsimile data received and stored by the facsimile reception job; and
a display/input unit control section for operating the display and the input unit so that contents of the jobs not yet executed by the facsimile control section are to be displayed one by one on the display unit in order each time an user presses the button on the input unit.

(2) A facsimile according to (1), wherein the display/input unit control unit, by way of operation on the input unit while the contents of the associated job are displayed on the display unit, causes the display unit and the input unit to operate as units that the user can issue an instruction to cancel the job.

(3) A facsimile comprising:
a display unit;
an input unit;
a facsimile control section for executing jobs including:
a read job for generating facsimile data based on a manuscript to be transmitted via facsimile;
a facsimile transmission job for transmitting facsimile data to a specified facsimile destination;
a facsimile reception job for receiving and storing transmitted facsimile data; and
a print job for printing facsimile data received and stored by the facsimile reception job,
wherein the facsimile control section executes queuing facsimile transmission jobs and print jobs; and
a display/input unit control section for operating the display unit and the input unit so that contents of the incomplete jobs are to be displayed on the display unit one by one in the order of the road job and the facsimile transmission job in response to a user's operation on the input unit, and in case that the facsimile transmission jobs are present, the contents of the facsimile transmission jobs are to be displayed in inverse order of management start time of each facsimile transmission job.

(4) A facsimile according to (3), wherein the display/input unit control section, by way of operation on the input unit while the contents of the associated job are displayed on the display unit, causes the display unit and the input unit to operate as units that the user can issue an instruction to cancel the job.

(5) A facsimile comprising:
a display unit;
an input unit;
a facsimile control section for executing jobs including:
a read job for generating facsimile data based on a manuscript to be transmitted via facsimile;
a facsimile transmission job for transmitting facsimile data to a specified facsimile destination;
a print job for printing facsimile data received and stored by the facsimile reception job,
wherein the facsimile control section executes queuing facsimile transmission jobs and print jobs; and
a display/input unit control section for operating the display unit and the input unit so that contents of the incomplete jobs are to be displayed on the display unit one by one in the order of the read job, the facsimile transmission job, the print job and the facsimile reception job in response to a user's operation on the input unit, and in case that the facsimile transmission jobs are present, the contents of the facsimile transmission jobs are to be displayed n inverse order of management start time of each facsimile transmission job, and in case that the pint jobs are present, the contents of the print jobs are to be display in inverse order of management start time of each print job.

(6) A facsimile according to (5), wherein the display/input unit control section, by way of operation on the input unit while the contents of the associated job are displayed on the display unit, causes the display unit and the input unit to operate as units that the user can issue an instruction to cancel the job.

(7) An information processing apparatus comprising:
   a display unit;
   an input unit including a button;
   a job execution section for executing a plurality of job types in parallel; and
   a display/input unit control section for operating the display unit and the input unit so that contents of the jobs not yet executed by the job execution section are to be displayed one by one on the display section in order each time the user presses the button of the input unit.

(8) The information processing apparatus according to (7), wherein the job execution section executes jobs including:
   a read job for generating facsimile data based on a manuscript to be transmitted via facsimile;
   a facsimile transmission job for transmitting facsimile data to a specified facsimile destination;
   a facsimile reception job for receiving and storing transmitted facsimile data; and
   a print job for printing facsimile data received and stored by the facsimile reception job, and
   wherein the display/input unit control section for operating the display and the input unit so that contents of the jobs not yet executed by the facsimile control section are to be displayed one by one on the display unit in order of the read job, the facsimile transmission job, the print job and the facsimile reception job each time an user presses the button on the input unit.

(9) The information processing apparatus according to (7), wherein the job execution section executes a reception job for receiving facsimile data and a non-reception job different from the reception job, and
   wherein the display/input unit control section operates the display unit and the input unit so that contents of the jobs not yet executed by the job execution section are to be displayed in the order of the non-reception job and the reception job each time the user presses the button on the input unit.

(10) The information processing apparatus according to (7), wherein the job execution unit executes a copy-related job executed to produce a copy of a manuscript and a non-copy-related executed for a purpose different from production of the copy of the manuscript, and
   wherein the display/input unit control section operates the display unit and the input unit so that contents of the jobs not yet executed by the job execution section are to be displayed in the order of the copy-related job and the non-copy-related job each time the user presses the button on the input unit.

(11) The information processing apparatus according to (7), wherein the display/input unit control section specifies the display order of jobs.

(12) A facsimile comprising:
   a display unit;
   an input unit;
   a facsimile control section for executing, in parallel, jobs including:
      a read job for generating facsimile data based on a manuscript to be transmitted via facsimile;
      a facsimile transmission job for transmitting facsimile data to a specified facsimile destination;
      a facsimile reception job for receiving and storing transmitted facsimile data; and
      a print job for printing facsimile data received and stored by the facsimile reception job; and
   a cancellation instruction acceptance section for executing an instruction input await processing for awaiting an operation on the input unit in a state where information to prompt input of an instruction on whether to cancel an arbitrary job managed as a running or waiting job by the facsimile control section is displayed on the display unit,
   wherein one of the jobs is selected by way of a predetermined algorithm from the running or waiting jobs by the facsimile control section when the button on the input unit is pressed to cancel the job, and
   wherein the cancellation instruction acceptance section executes the instruction input await processing on the selected job.

(13) The facsimile according to (12), wherein the predetermined algorithm used by the cancellation instruction acceptance section is an algorithm whereby in case information concerning the job managed as the running or waiting job by the facsimile control section is displayed on the display unit, the job is selected.

(14) The facsimile according to (12), wherein the predetermined algorithm used by the cancellation instruction acceptance section is an algorithm whereby in case the facsimile control section is executing the read job, the read job is selected, whereby in case the facsimile control section is not executing the read job and the facsimile control section is managing the facsimile transmission job as a running or waiting job, the facsimile transmission job is selected, and whereby in case the facsimile control section is not executing the read job and the facsimile control section is not managing a facsimile transmission job as a running or waiting job, but managing the print job as a running or waiting job, the print job is selected.

(15) The facsimile according to (12), wherein the facsimile control section manages a plurality of the facsimile transmission jobs and a plurality of the print jobs, and
   wherein the predetermined algorithm used by the cancellation instruction acceptance section is an algorithm whereby in case the facsimile control section is executing the read job, the read job is selected, whereby in case the facsimile control section is not executing the read job and the facsimile control section is managing one or more facsimile transmission jobs as one or more running or waiting jobs, the facsimile transmission job whose management start time by the facsimile control section is the latest is selected, and whereby in case the facsimile control section is not executing a read job and the facsimile control section is not managing a facsimile transmission job as a running or waiting job, but managing one or more print jobs as one or more running or waiting jobs, a print job whose management start time by the facsimile control section is the earliest is selected.

(16) The facsimile according to (12), wherein the instruction input await processing executed by the cancellation instruction acceptance section changes a target job when a predetermined operation is made on the input unit.

(17) The facsimile according to (12), wherein the facsimile control section cancels the job without making an inquiry to the user about whether to cancel the job in case a job must be canceled.

(18) An information processing apparatus comprising:
   a display unit;
   an input unit;
   a job execution section for executing a plurality of jobs in parallel, and
   a cancellation instruction acceptance section for executing an instruction input await processing for awaiting an operation on the input unit in a state where information to prompt input of an instruction on whether to cancel each job being executed by the job execution section and each job to be executed by the job execution section is displayed on the display unit,
   wherein the job is selected by way of a predetermined algorithm from the jobs being executed by the job execution section and the jobs to be executed by the job execution section when a predetermined button provided on the input unit is pressed to cancel the job, and
   wherein the cancellation instruction acceptance section starts the instruction input await processing on the selected job.

(19) The information processing apparatus according to (18), wherein
   the job execution section executes:
   a read job for generating image data of a manuscript by using a scanner,
   a facsimile transmission job for transmitting facsimile data to a specified facsimile destination,
   a facsimile reception job for receiving and storing transmitted facsimile data, and
   a print job for printing facsimile data generated by the read job and facsimile data received by the facsimile reception job, and
   the cancellation instruction acceptance section determines whether jobs are present in the order of the read job, the facsimile transmission job, the print job, and the facsimile reception job and selects the first detected job.

(20) The information processing apparatus according to (18), wherein
   the job execution section executes a reception job for receiving facsimile data and a non-reception job different from the reception job, and
   the cancellation instruction acceptance section determines whether jobs are present in the order of the reception job and the non-reception job and selects the first detected job.

(21) The information processing apparatus according to (18), wherein
   the job execution section executes a copy-related job executed to produce a copy of a manuscript and a non-copy-related job executed for a purpose different from production of a copy of a manuscript, and
   the cancellation instruction acceptance section determines whether jobs are present in the order of the copy-related job and the non-copy-related job and selects the first detected job.

(11) The information processing apparatus according to (7), wherein the cancellation instruction acceptance section sets the predetermined algorithm.

BRIEF DESCRIPTION OF THE DRAWINGS

FIG. 15 explains a job information display order definition file stored in the control unit according to the second embodiment;

FIG. 16 explains the job information display order definition file stored in the control unit according to the second embodiment;

FIG. 17 explains the job information display order definition file stored in the control unit according to the second embodiment;

FIG. 18 explains the job information display order definition file stored in the control unit according to the second embodiment;

DETAILED DESCRIPTION OF PREFERRED EMBODIMENTS

Embodiments for carrying out the invention are detailed below referring to drawings.

First Embodiment

Figure 2:
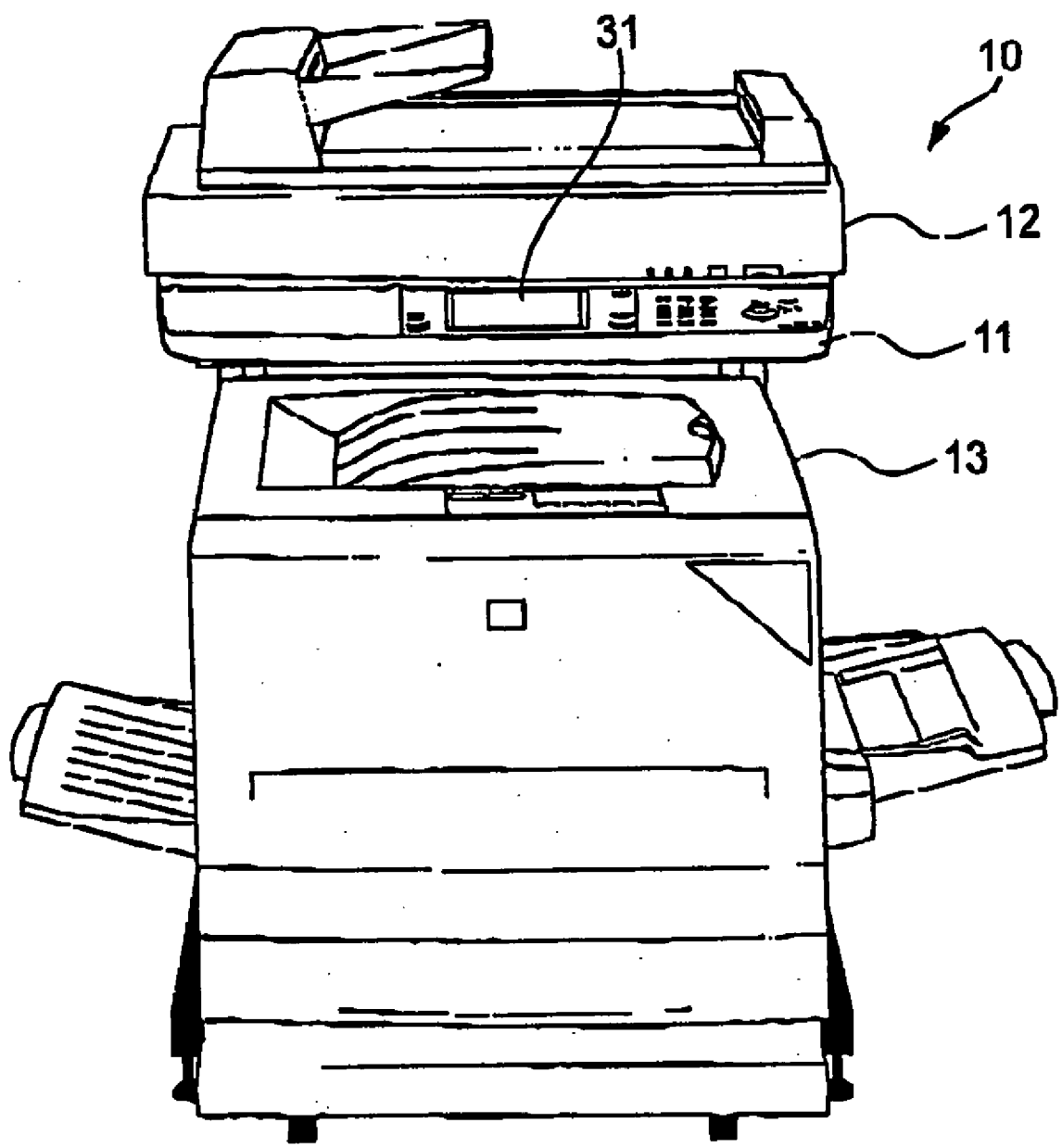
FIG. 2 is an external view of the facsimile according to the first embodiment of the invention.
Figure 3:
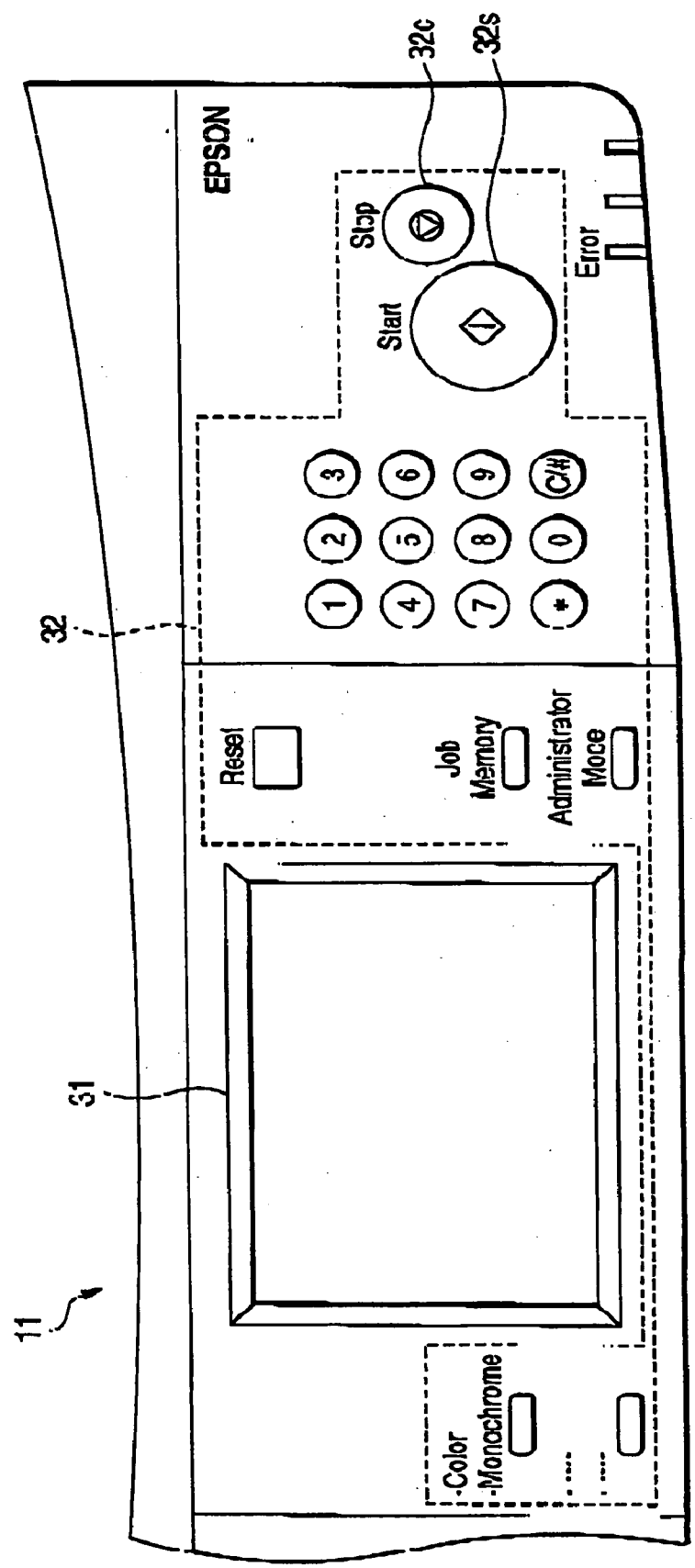
FIG. 3 is an external view of a control unit used for the facsimile according to the first embodiment of the invention.

The hardware configuration of a facsimile 10 according to the first embodiment of the invention is described below referring to FIGS. 1 through 3.

Figure 1:
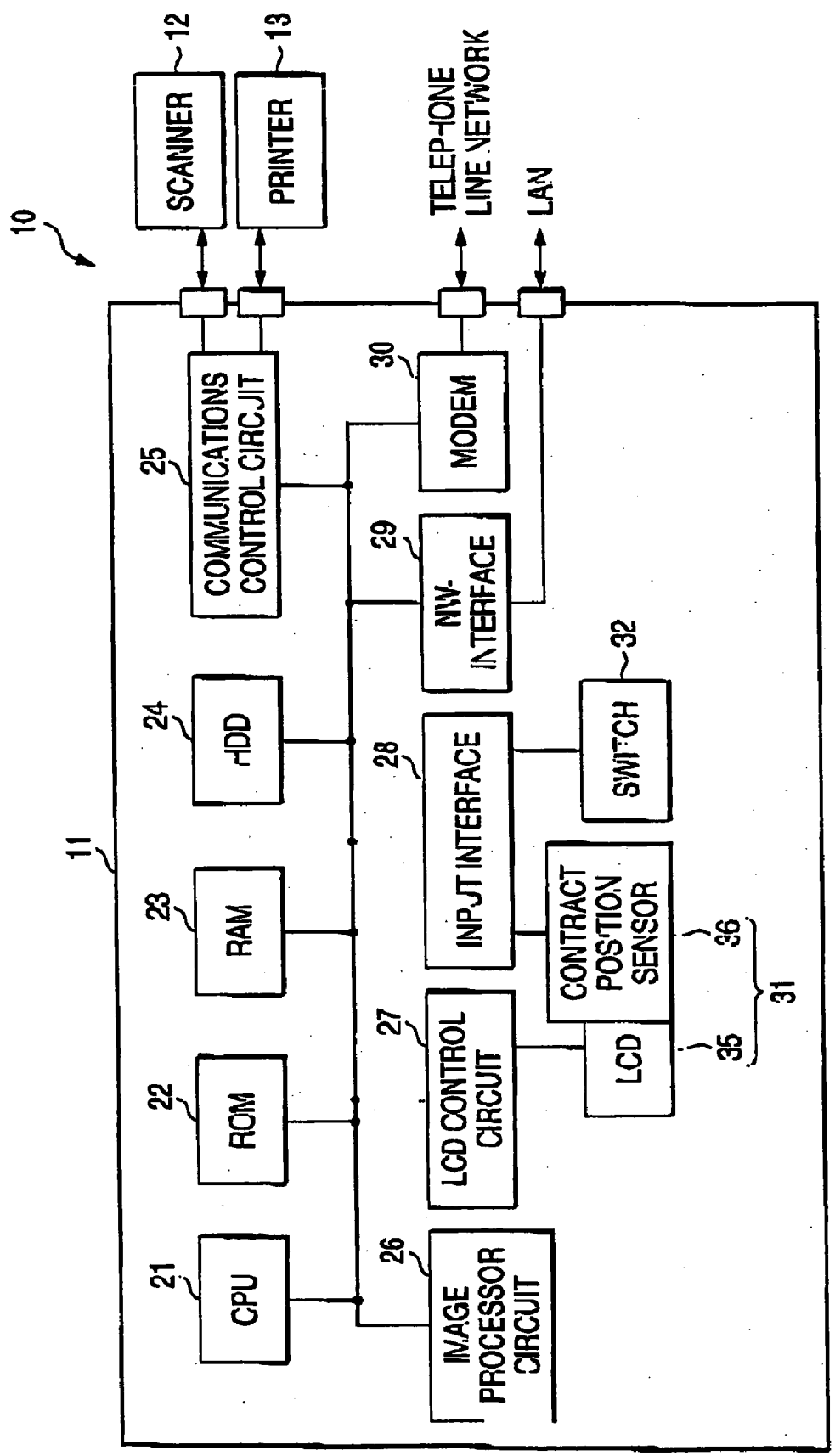
FIG. 1 is a block diagram of a facsimile according to a first embodiment of the invention.

As shown in FIG. 1, the facsimile 10 according to this embodiment is a combination of a control unit 11, a scanner 12 and a printer 13. The facsimile 10 according to this embodiment has the same external appearance as a general digital multifunction machine/copier, as shown in FIG. 2.

The printer 13 used for the facsimile 10 is a printer available as a peripheral unit of a computer, the printer comprising an expansion board for configuring the facsimile 10, that is, for connecting the control unit 11 and the printer 13. The scanner 12 is a scanner available as a peripheral unit of a computer, the scanner comprising an expansion board for configuring the facsimile 10, that is, for connecting the control unit 11 and the scanner 12. The scanner 12 is a unit capable of reading a double-sided manuscript, that is, a unit having an ADF (Automatic Document Feeder) which can turn the manuscript inside out.

The control unit 11 is a unit for operating the scanner 12, the printer 13 and the control unit itself as a unit capable of transmitting/receiving a facsimile. As shown in FIG. 1, the control unit 11 comprises a CPU 21, a ROM 22, a RAM 23, an HDD 24, a communications control circuit 25, an image processor circuit 26, an LCD control circuit 27, an input interface circuit (input I/F) 28, a network interface circuit (NW-I/F) 29, a modem 30, a touch-sensitive screen 31, and a switch 32.

The touch-sensitive screen 31 of the control unit 11 to a device comprising a liquid crystal display (LCD) 35 and a transparent contact position sensor 36 mounted thereon. As shown in FIG. 3, the switch 32 is a unit comprising a Start button 32s, a Stop button 32c and a ten-key pad provided on the housing of the control unit 11 and corresponding control circuits (not shown).

The CPU 21 is a control circuit for integrally controlling each section of the facsimile 10 (each section of the control unit 11, the scanner 12 and the printer 13). The ROM 22 is a read-only memory in which a program specifying the operation procedure of the CPU 21 and data used by the CPU 21 (program) are recorded. The RAM 23 is a memory into which a program recorded in the ROM is read and which is used as a work area for the CPU 21 (program). The communications control circuit 25 is a circuit used by the CPU 21 to perform information exchange (command transmission, image data reception and print data transmission) to/from the scanner 12 or the printer 13. The image processor circuit 26 is a circuit for performing various types of image processing on the image data generated by the scanner 12 (multilevel image data in this embodiment).

The LCD control circuit 27 is a circuit for displaying on the touch sensitive screen 31 (LCD 35) an image (screen) instructed by the CPU 21. The input interface screen 28 is a circuit for communicating the operation of the user (operator of the facsimile 10) on the ten-key pad 32 or touch-sensitive screen 31 (contact position sensor 36) to the CPU 21. The network interface circuit 29 is a circuit for connecting the control unit 11 to a LAN. The modem 30 is a circuit for connecting the control unit 11 to a telephone line network.

The HDD 24 is an auxiliary storage unit (hard disk unit) mounted on the control unit 11 so as to store temporary files (data to be supplied to the printer, data to be transmitted via facsimile, received facsimile data not yet printed, and digital document files to be transmitted to another computer) as well as various information to be held even when the power is turned off (registered facsimile numbers, IP addresses and information on the running/waiting jobs).

Operation of the facsimile 10 (operation of the control unit 11) will be described. The control unit 11 according to this embodiment can operate the scanner 12, the printer 13 and the control unit itself as a copier and operating the scanner 12 and the control unit itself as a digital document creation unit (unit having a function to create a digital document—image data file of the manuscript—from the set manuscript and transmit the file by using the TCP/IP protocol). However, in the following description, operation of the control unit 11 alone assumed in case the facsimile 10 is operating as a unit capable of transmitting/receiving facsimile is described.

The control unit 11 is outlined below.

The control unit 11 is a unit capable of executing a read job, a facsimile transmission job, a facsimile reception job and a print job. The read job is a job which converts a manuscript to be transmitted via facsimile by using the scanner 12 and performing image processing on the image data to generate facsimile data (data used for facsimile transmission). The facsimile transmission job is a job which transmits facsimile data prepared by the read job via facsimile. The facsimile reception is a job which receives transmitted facsimile data. The print job is a job which causes the printer 13 to print a printing matter corresponding to the facsimile data received by the facsimile reception job.

Figure 4:
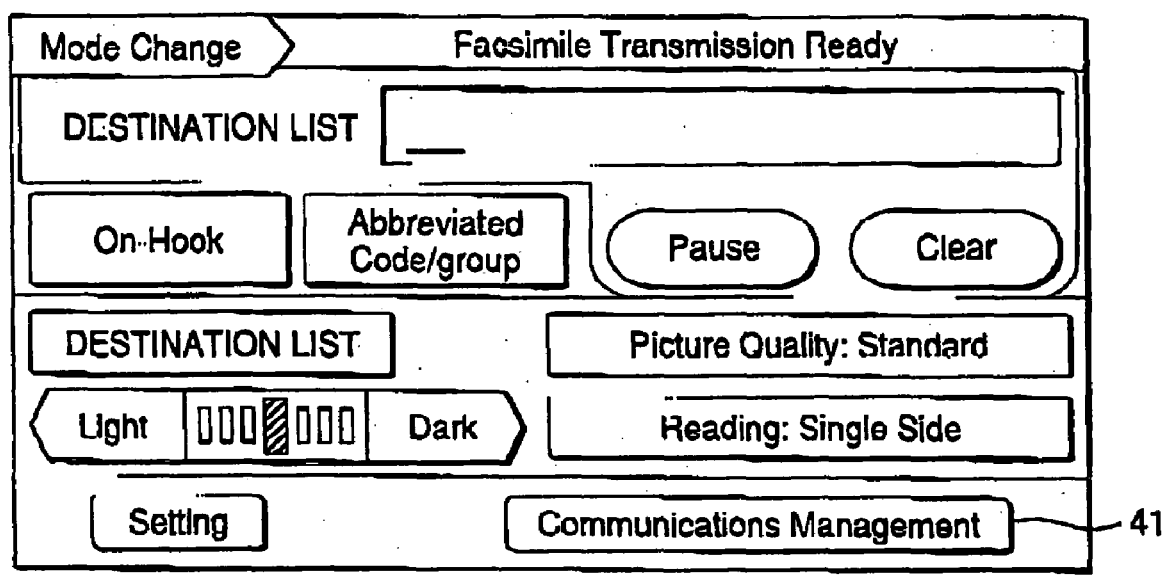
FIG. 4 explains a basic screen for facsimile displayed by the control unit.

The control unit 11 is a unit capable of keeping a waiting job (so-called queuing) concerning a facsimile transmission job and a print job as well as a unit capable of executing a read job, a print job and a facsimile transmission job or a facsimile reception job in parallel (a unit which cannot execute a facsimile transmission job and a facsimile reception job concurrently). The control unit 11 is normally a unit for displaying a basic screen for facsimile shown in FIG. 4 on the touch-sensitive screen 31 (to be more precise, a unit which allows the user to display a basic screen for facsimile shown in FIG. 4 on the touch-sensitive screen 31; detailed later) as well as a unit which starts a read job when the start button 32s (see FIG. 3) is pressed after setting of facsimile destination on the basic screen for facsimile is made.

The control unit 11 is characterized by the operation of presenting to the user the contents of a running/waiting job and the operation of accepting a job cancellation (deletion) instruction.

Based on the above, operation of the facsimile 10 (control unit 11) according to this embodiment is detailed below.

The control unit 11 is a unit which executes job information display processing to present to the user the contents of each running/waiting job when a predetermined operation starting with a push on a "Communications Management" button 41 on the basic screen for facsimile (FIG. 4) is made, that is, an operation of pressing the "Communications Management" button 41 then a specific button accordingly displayed on the touch-sensitive screen 31: hereinafter referred to as the job information display processing start instruction is made and when a read job is executed. The job information display processing accepts a job cancellation instruction.

In case the Stop button 32c is pressed when the job information display processing is not executed, the control unit 11 works as a unit which executes a job cancellation instruction acceptance processing as processing to accept a job cancellation instruction.

Operation of the control unit 11 in the job information display processing is described first.

Figure 5:
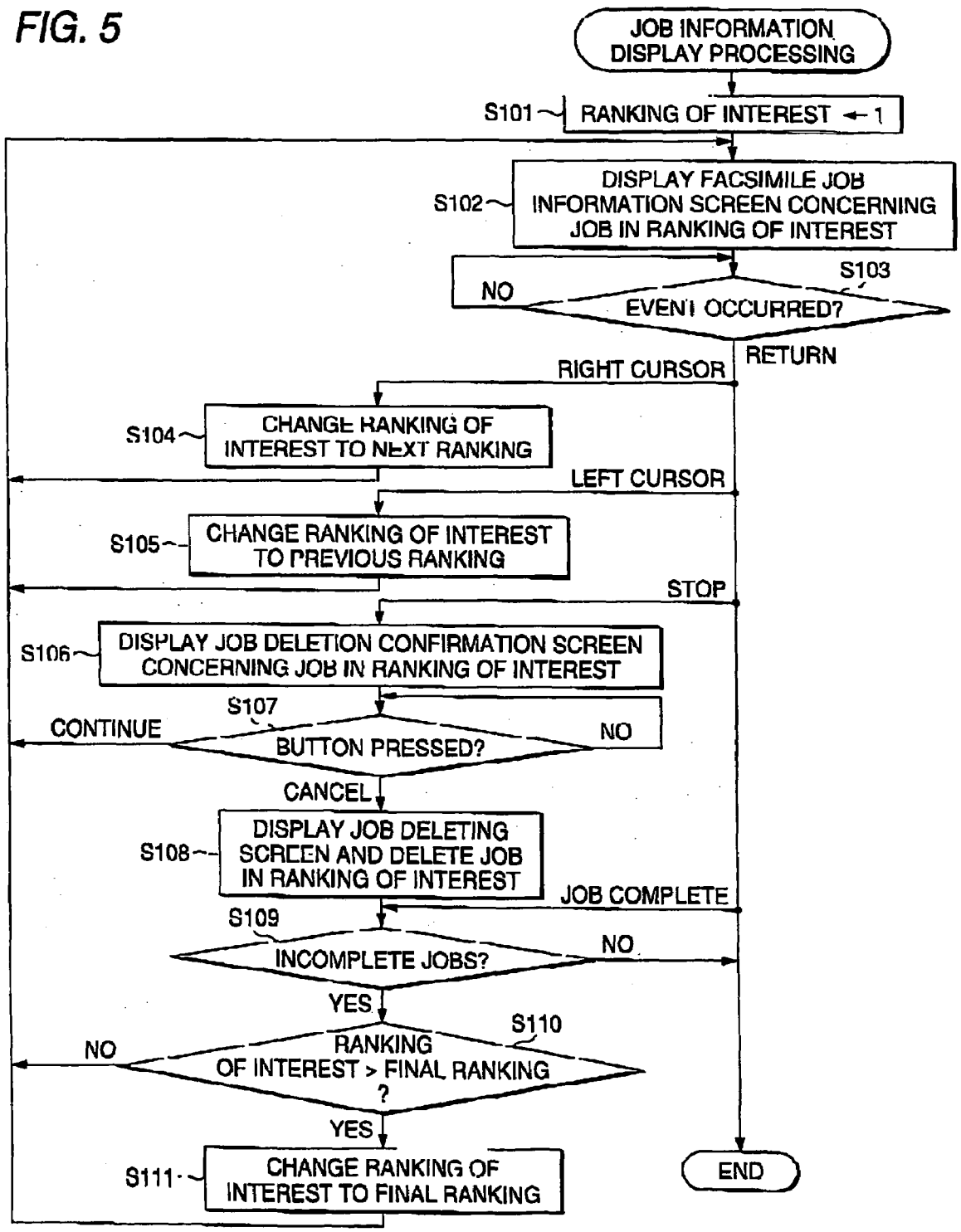
FIG. 5 is a flowchart of job information display processing executed by the control unit.

As shown in FIG. 5, the control unit 11 which started a job information display processing stores the ranking of interest "1" (first ranking) in step 101 and displays on the touch-sensitive screen 31 a facsimile job information display screen concerning a job whose job ranking is the ranking of interest (step S102).

The job ranking is a virtual ranking assigned to each job so that the order of a read job, a facsimile transmission job, a print job, and a facsimile reception job will be maintained for the running/waiting jobs, that the inverse order of job management start time (order of time a job is started/queued) will be maintained for a plurality of facsimile transmission jobs, and that the job management start order will be maintained for a plurality of print jobs.

The facsimile job information display screen is a screen shown in FIGS. 6A through 6D and FIGS. 7A through 7D. The facsimile job information display screens shown in FIGS. 7A through 7D are displayed on the touch-sensitive screen 31 by way of job information display processing started as a result of activation of a read job. The area 51p on the facsimile job information display screen shown in FIG. 7A displays the number of pages which have been read. The facsimile job information display screens shown in FIGS. 6A through 6D are displayed on the touch-sensitive screen 31 by way of job information display processing started as a result of job information display processing start instruction operation or job information display processing (on completed read jobs) started as a result activation of a read job.

Figure 6:
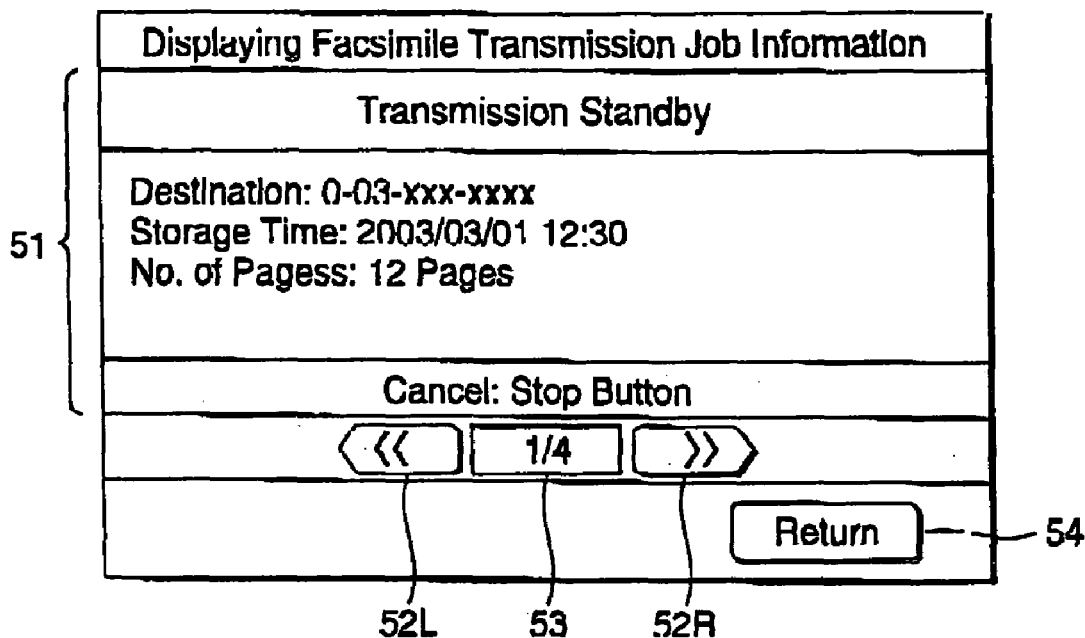
FIGS. 6A to 6D show facsimile job information display screens displayed on a touch-sensitive screen while job information display processing is executed.
Figure 6:
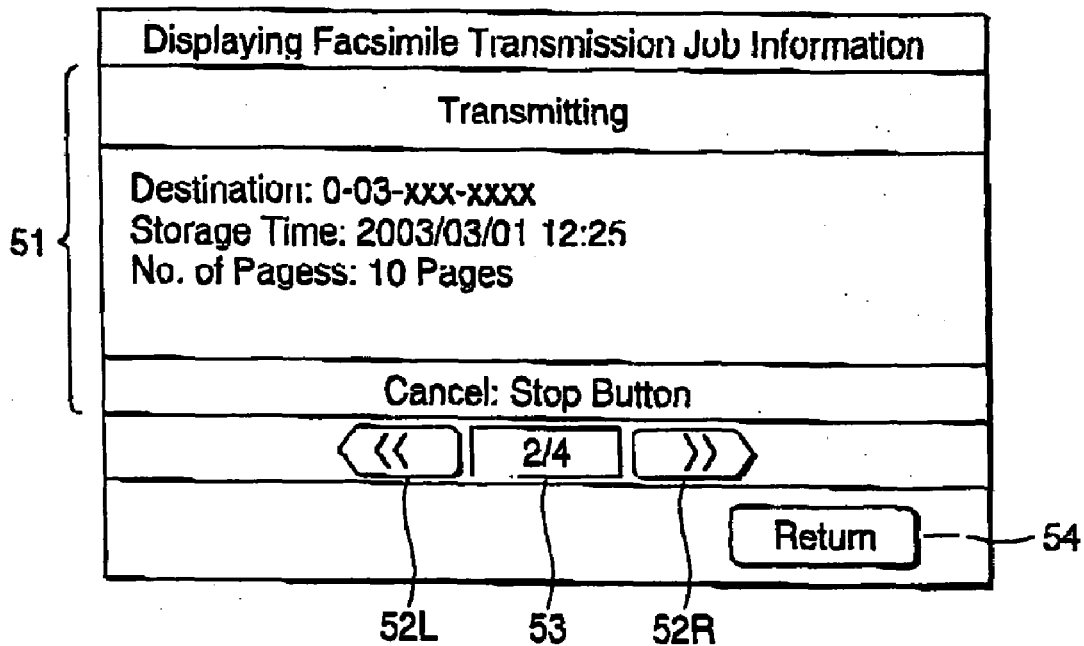
Figure 6:
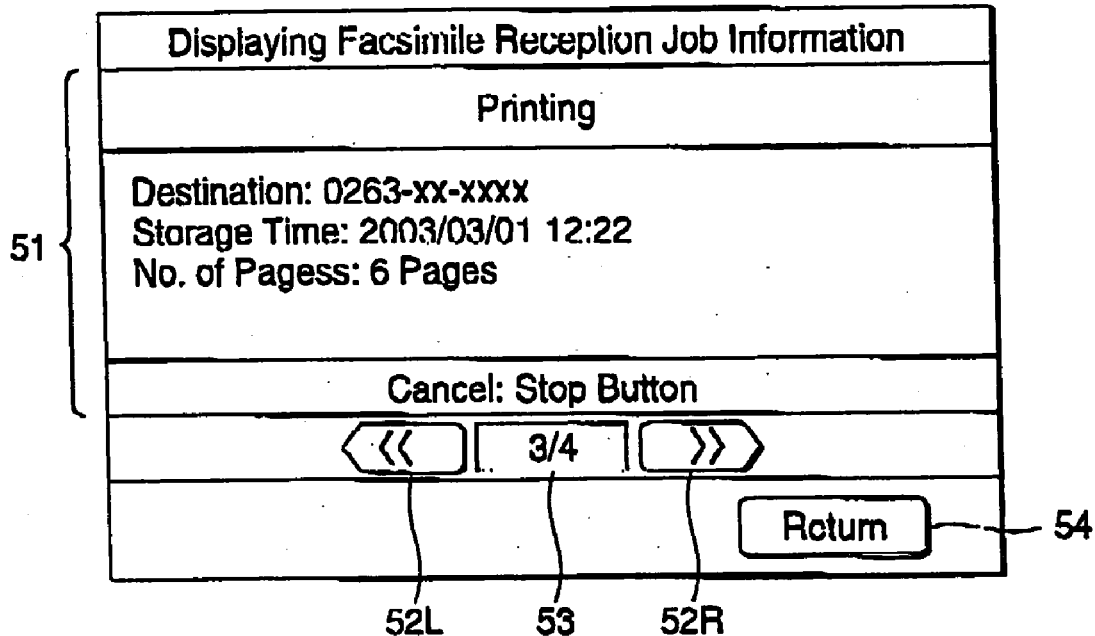
Figure 6:
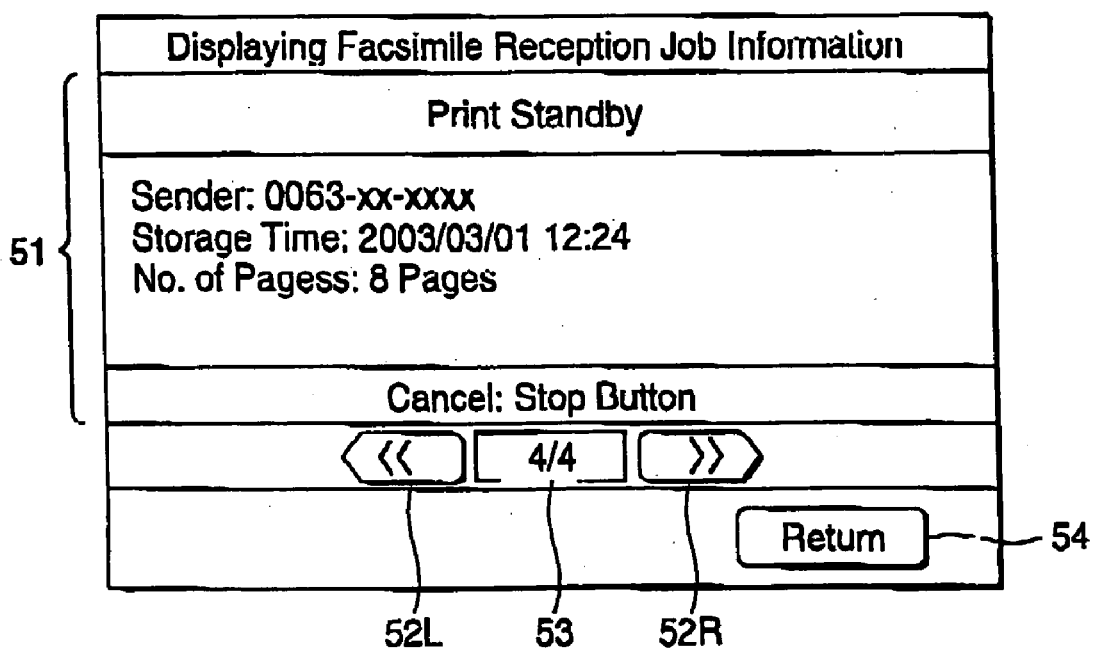
Figure 7:
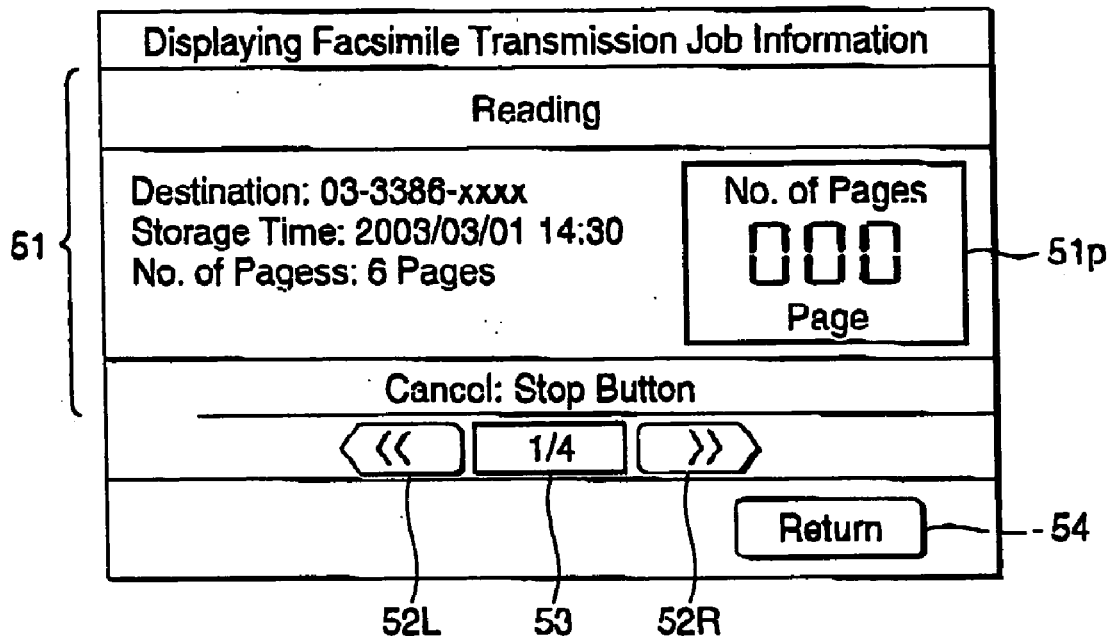
FIGS. 7A to 7D show facsimile job information display screens displayed on the touch-sensitive screen while job information display processing is executed.
Figure 7:
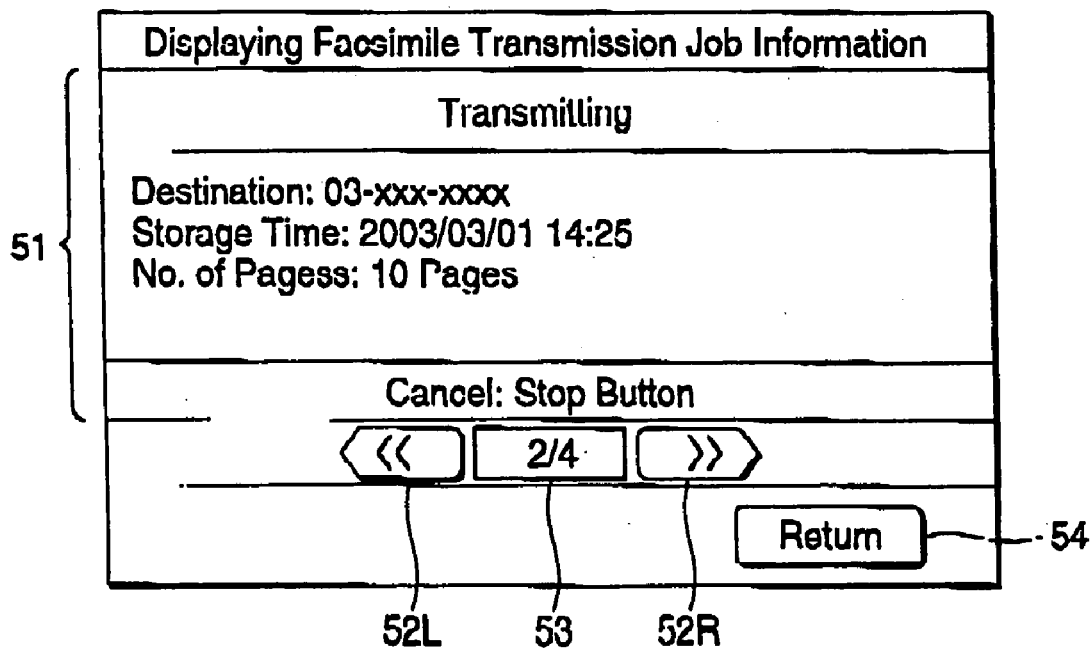
Figure 7:
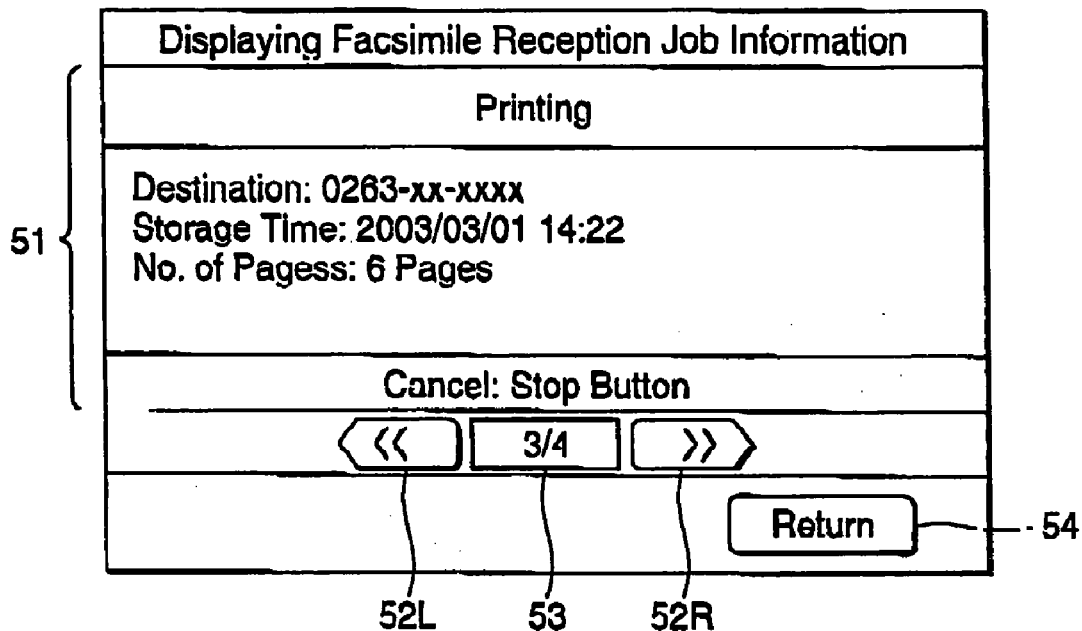
Figure 7:
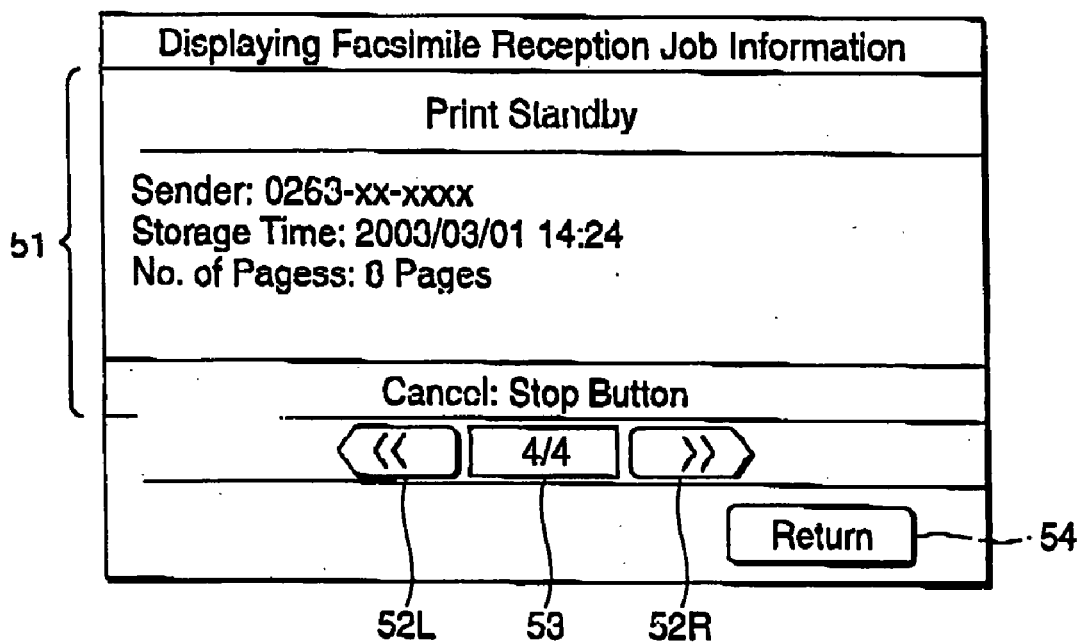

As assumed from these drawings, the facsimile job information display screen comprises an information display area 51 for displaying the contents of a job whose job ranking matches the ranking of interest (hereinafter referred to as the job in the ranking of interest), a left cursor button 52L, a right cursor button 52R, a job ranking/total count display area 53 for displaying the ranking of interest/total job count (such as "1/4" and "2/4"), and a "Return" button 54. On the facsimile job information display screen, in case the ranking of interest is "1", the left cursor button 52L is inactive (grayed out and does not respond when pressed) as shown in FIGS. 6A and 7A. In case the ranking of interest matches the total job count, the right cursor button 52R is inactive as shown in FIGS. 6D and 7D. Further, on the facsimile job information display screen, while a read job is not under way, the "Return" button 54 is active as shown in FIGS. 6A through 6D, and while a read job is under way, the "Return" button 54 is inactive as shown in FIGS. 7A through 7D.

The control unit 11 which has displayed the facsimile job information display screen on the touch-sensitive screen 31 enters a state of monitoring a push on a button on the facsimile job information display screen displayed on the touch-sensitive screen 31, a push on the Stop button 32c and termination of a running job (FIG. 5; step S103).

In case the right cursor button 52R is pressed (step S103; Right cursor), the control unit 11 changes the ranking of interest to the next ranking (adds "1" to the ranking of interest) (step S104) and executes step S102 and the subsequent steps again. In case the left cursor button 52L is pressed (step S103; Left cursor), the control unit 11 changes the ranking of interest to the previous ranking (subtracts "1" from the ranking of interest) (step S105) and executes step S102 and the subsequent steps again.

That is, the control unit 11, in case the right cursor button 52R on one of the facsimile job information display screens shown in FIGS. 6A through 6C and FIGS. 7A through 7C is pressed, changes the facsimile job information display screen on the touch-sensitive screen 31 to a screen shown in FIGS. 6B through 6D and FIGS. 7B through 7D, respectively. The control unit 11, in case the left cursor button 52L on one of the facsimile job information display screens shown in FIGS. 6B through 6D and FIGS. 7B through 7D is pressed, changes the facsimile job information display screen on the touch-sensitive screen 31 to a screen shown in FIGS. 6A through 6C and FIGS. 7A through 7C, respectively.

In case the Stop button 32c is pressed (step S103; Stop), the control unit 11 displays the job deletion confirmation screen concerning the job in the ranking of interest (job whose ranking matches the ranking of interest) on the touch sensitive screen 31 (step S106).

Figure 8:
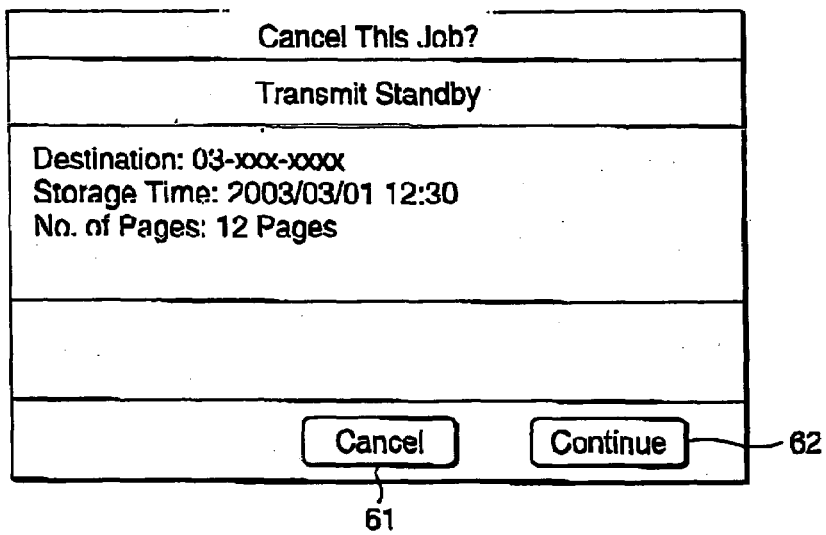
FIGS. 8A to 8C shows screens displayed on the touch-sensitive screen when a Stop button is pressed while job information display processing is executed.
Figure 8:
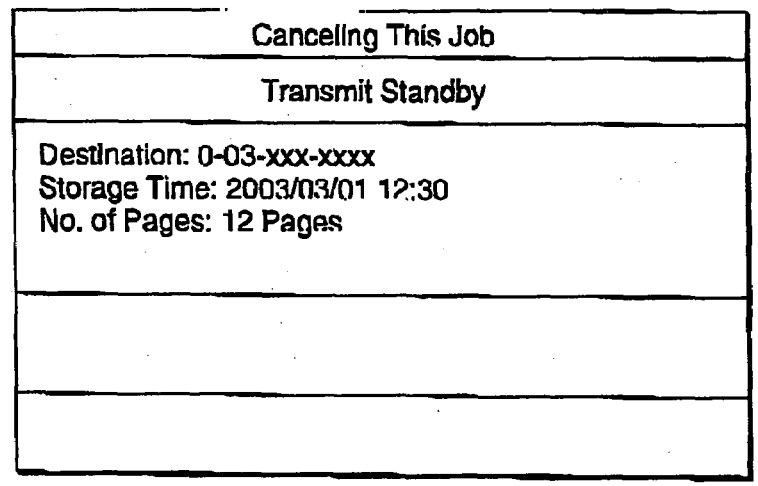
Figure 8:
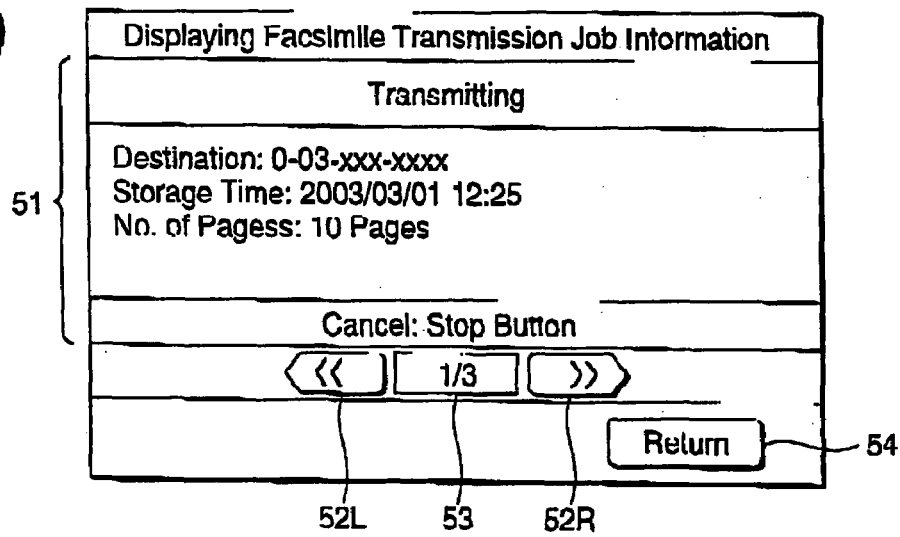

The job deletion confirmation screen displayed in step S106 is a screen including a "Cancel" button 61 and a "Continue" button 62 as illustrated in FIG. 8A as well as information indicating what job is to be canceled. The job deletion confirmation screen shown in FIG. 8A is displayed on the touch-sensitive screen 31 when the Stop button 32s is pressed while the facsimile job information display screen is displayed on the touch sensitive screen 31.

The control unit 11 which has displayed the job deletion conformation screen on the touch-sensitive screen 31 enters a state of awaiting a push on the "Cancel" button 61 or "Continue" button 61 (step S107). In case the "Continue" button 62 is pressed (Step S107; Continue), the control unit 11 executes step S102 and the subsequent steps. That is, the control unit 11 displays on the touch-sensitive screen 31 the same facsimile job information display screen as that displayed when the Stop button 32c is pressed and enters a state of awaiting an event such as a push on the button by the user and termination of a running job.

In case the "Cancel" button 62 on the job deletion conformation screen (FIG. 8A) is pressed (step S107; Cancel), the control unit 11 performs deletion of a job in the ranking of interest with the job deleting screen displayed on the touch-sensitive screen 31 (step S108). The job deleting screen is a screen for notifying the user that the specified job is being canceled. For example, in case the "Cancel" button 61 on the job deletion confirmation screen shown in FIG. 8A is pressed, the screen shown in FIG. 8B is displayed as the job deleting screen on the touch-sensitive screen 31.

Terminating the processing of step S108 (FIG. 5), the control unit 11 determines whether an incomplete job remains (Step S109). In case an incomplete job remains (step S109; YES), the control unit 11 determines whether the ranking of interest at that point in time exceeds the final job ranking (total count of incomplete job after job deletion) at that point in time (step S110). In case the ranking of interest does not exceed the final ranking (step S110; NO), the control unit 11 executes step S102 and the subsequent steps without changing the ranking of interest. In case the ranking of interest exceeds the final ranking (step S110;YES), the control unit 11 changes the ranking of interest to the final ranking (step S111) then executes step S102 and the subsequent steps.

That is, the control unit 11, in case it has displayed the job deleting screen shown in FIG. 8B on the touch-sensitive screen 31, executes the processing of step S102 while maintaining the ranking of interest to "1" to display on the touch-sensitive screen 31 the facsimile job information display screen shown in FIG. 8C (same screen as the facsimile job information display screen shown in FIG. 6B except that it displays "1/3" in the job ranking/total count display area 53 because the total number of running/waiting jobs is decreased by 1).

In case the Stop button 32c is pressed while the facsimile job information display screen shown in FIG. 6D is displayed on the touch-sensitive screen 31 and a waiting print job is actually canceled (deleted), the control unit 11 changes the ranking of interest to "3" and executes the processing of step S102. In this case, the control unit 11 displays on the touch-sensitive screen 31 the facsimile job information display screen corresponding to FIG. 6C (where "3/3" is displayed in the job ranking/total count display area 53).

In case there are no incomplete jobs (step S109; NO) as a result of job cancellation (deletion) in step S108 (FIG. 5), the control unit 11 terminates the job information display processing. In case the "Return" button 54 (active) on the facsimile job information display screen is pressed (step S103; Return), the control unit also terminates the job information display processing. The control unit 11 then displays a screen of the same type as that displayed just before start of the job information display processing.

In case a running job is terminated (step S103; Job complete), the control unit 11 executes step S109 and the subsequent steps described earlier. That is, in case there remain no incomplete jobs, the control unit 11 terminates the job information display processing. In case there remains an incomplete job, the control unit 11 changes the ranking of interest as required and changes the facsimile job information display screen on the touch-sensitive screen 31 to a screen reflecting the current state (a screen with the contents in the job ranking/total count display area 53 changed or a screen showing a different form of the "Return" button 54).

Figure 9:
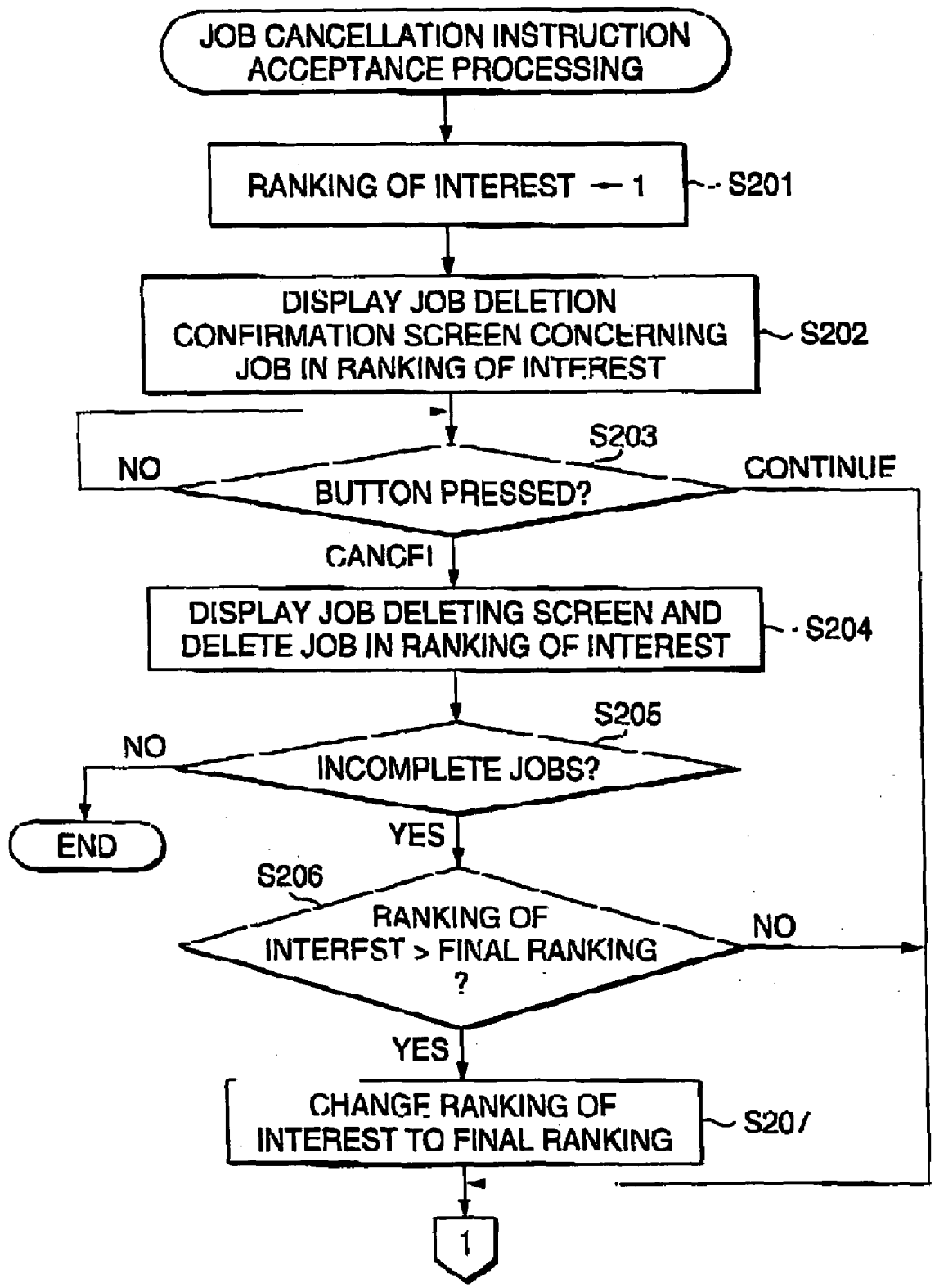
FIG. 9 is a flowchart of job cancellation instruction acceptance processing executed by the control unit.
Figure 10:
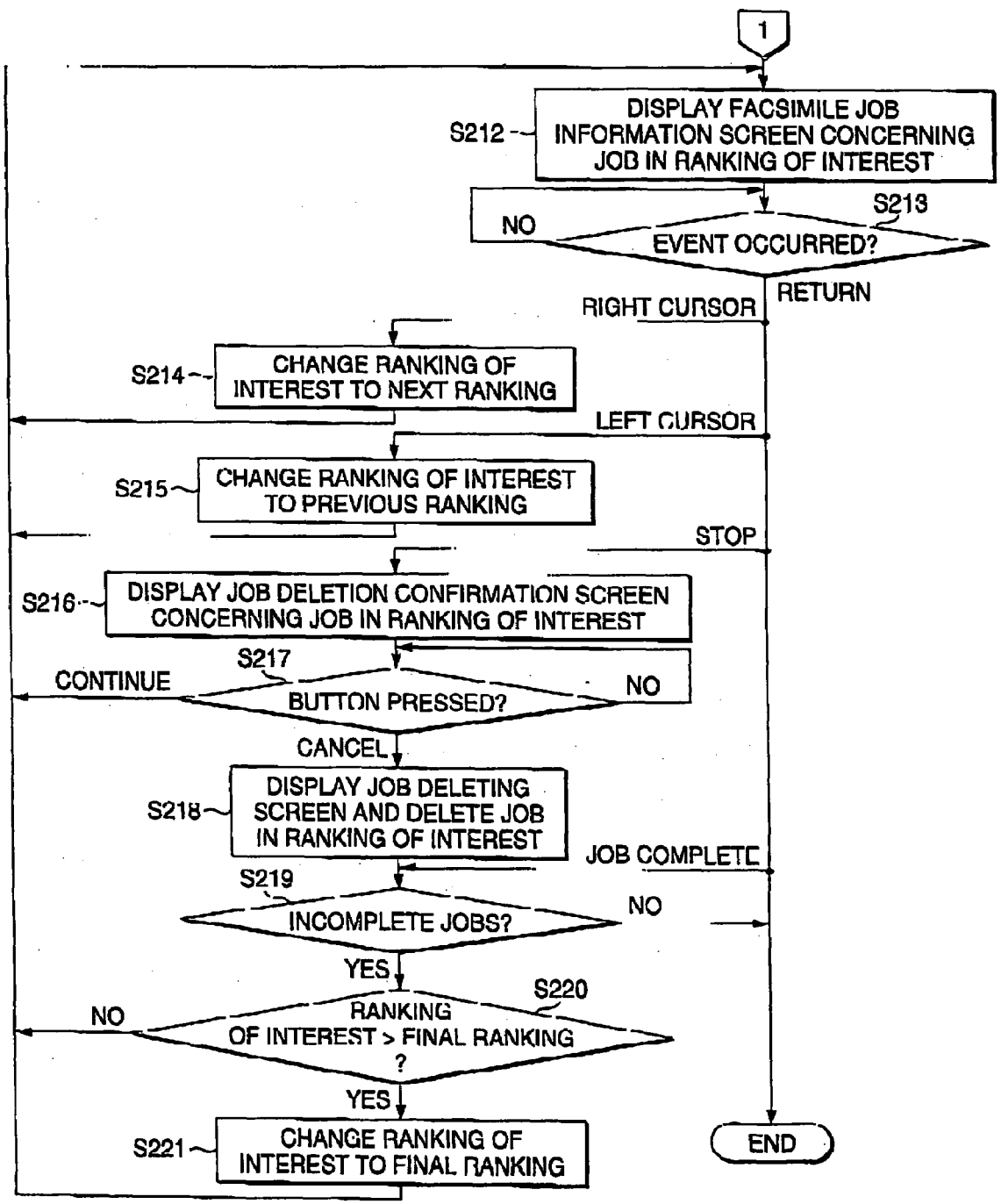
FIG. 10 is a continuation of the flowchart of job cancellation instruction acceptance processing executed by the control unit shown in FIG. 9.

Next, operation of the control unit 11 assumed when a job cancellation instruction is accepted is described below referring to FIGS. 9 and 10.

As mentioned earlier, the job cancellation instruction acceptance processing is executed by the control unit 11 when the Stop button 32 is pressed in a state where the job information display processing is not under way (in other words, a state where the facsimile job information display screen is not displayed on the touch-sensitive screen 31). As understood from the comparison between the flowcharts of job cancellation acceptance processing (FIGS. 9 and 10) and the flowchart of facsimile job information display processing (FIG. 5), the job cancellation instruction acceptance processing is quite similar to the facsimile job information display processing.

To be more precise, step S201 and steps S202 through S209 of the job cancellation instruction acceptance processing (FIG. 9) are the same as step S101 and steps S106 through S111 in the job information display processing (FIG. 5). Steps S212 through S221 of the job cancellation instruction acceptance processing (FIG. 10) are the same as steps S102 through S111 in the job information display processing (FIG. 5) respectively.

The control unit 11, in response to a push on the Stop button 32c in a state where the facsimile job information display screen is not displayed on the touch-sensitive screen 31, has started the job cancellation instruction acceptance processing. The control unit 11 then displays on the touch-sensitive screen 31 the job deletion confirmation screen (FIG. 8A) concerning a job whose ranking is the first ranking. The control unit 11 which has displayed the job deletion confirmation screen starts the same processing as the processing to proceed to step S107 in the facsimile job information display processing.

Finally, operation of the control unit 11 assumed in case an error has taken place on which there is no way but delete a job (action to delete a job is the only solution) will be described.

Figure 11:
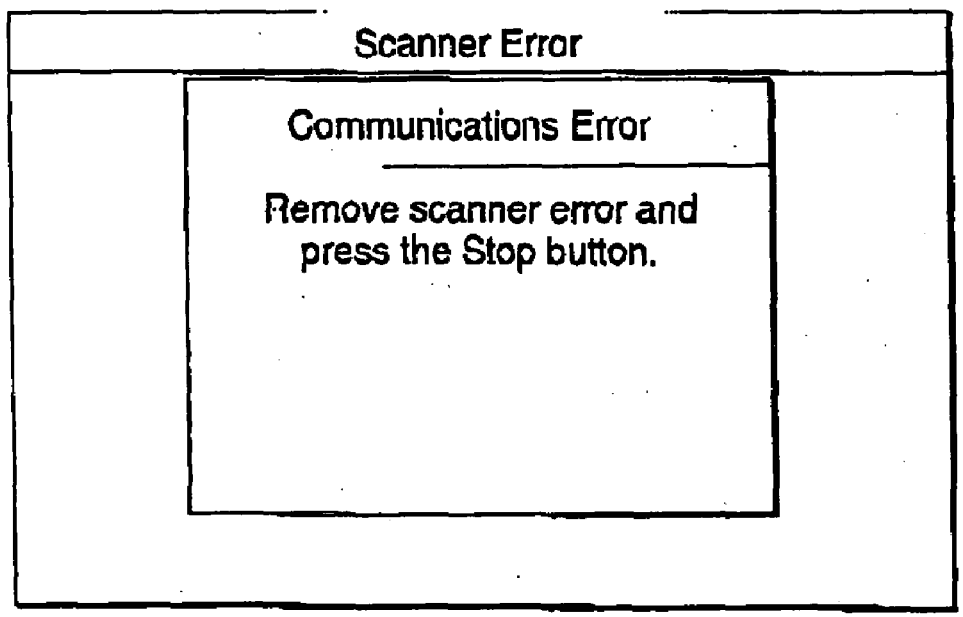
FIGS. 11A and 11B explain the operation of the control unit in a state where there is no way but cancel a job.
Figure 11:
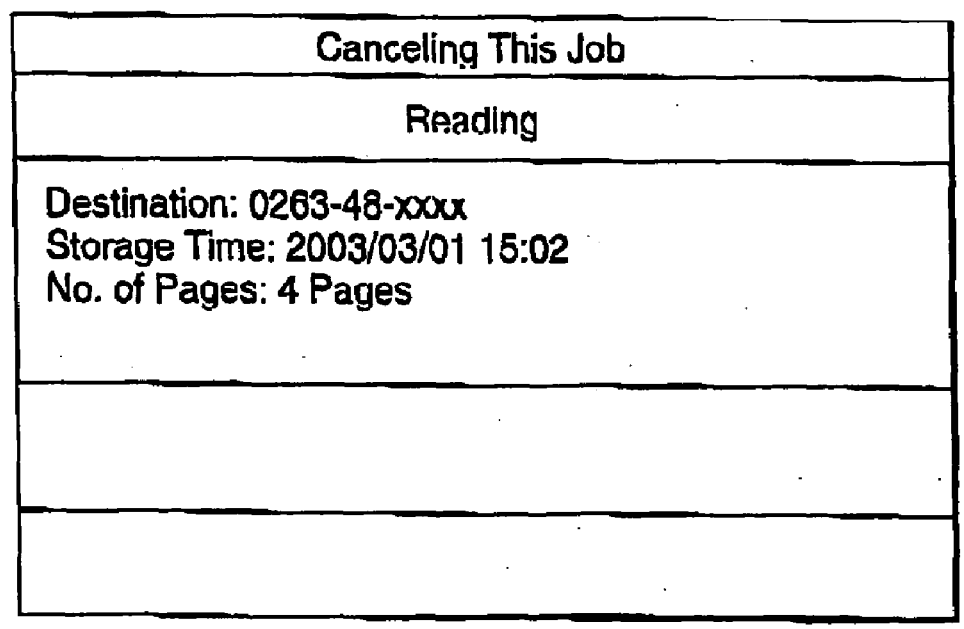

In case an error has taken place on which there is no way but cancel (delete) a job, the control unit 11 cancels (deletes) the job without making an inquiry to the user about whether to cancel the job. For an error which needs some action on the part of the user, the control unit 11 notifies the user of the completion of the action then cancels (deletes) the job. To be more specific, in case a communications error between the control unit 11 and a scanner has taken place, the control unit 11 displays the screen shown in FIG. 11A, displays the screen shown in FIG. 11B on the touch-sensitive screen 31, and cancels (deletes) the job.

As detailed hereinabove, the control unit 11 according to the first embodiment allows the user to check the contents of each running/waiting job without selecting summary information from a list of job summary information while the facsimile job information display processing (FIG. 5) is under way. Thus, the facsimile according to the aspects of the invention functions as a unit on which checkup of the contents of each running/waiting job is made easier than a facsimile on which it is necessary to select summary information from a list of job summary information. Further, the facsimile job information display processing presents to the user the contents of each job in the order of (a read job), a facsimile transmission job, a print job, and a facsimile reception job one by one. In case a plurality of facsimile transmission jobs are present, the control unit 11 presents the contents of the facsimile transmission jobs in inverse order of management start time of each facsimile transmission job. In case a plurality of print jobs are present, the control unit 11 presents the contents of the print jobs in inverse order of management start time of each print job.

A facsimile reception job or a print job is a job whose contents the user rarely wishes to check. For a facsimile transmission job, a job whose acceptance ranking is lower (whose management start time is later) is preferably checked quickly or with simple operation. This is because the user often wishes to check the contents of work just after the work is complete.

Thus the facsimile 10 is also a unit on which it is not necessary for the user to check information on a job which does not require checkup of the contents.

As detailed hereinabove, in case a read job is being executed when the user presses the Stop button 32c in order to cancel a job, the control unit 11 selects the read job as a job to be canceled (a job to be displayed on the job cancellation confirmation screen). In case a read job is not being executed and one or more running/waiting facsimile transmission jobs are present, the control unit 11 selects a facsimile transmission job accepted latest (a facsimile transmission job whose management time is the latest) among the one or more facsimile transmission jobs as a target job. In case a read job is not being executed and one or more running/waiting print jobs are present, the control unit 11 selects a facsimile transmission job accepted earliest among the one or more print jobs as a target job.

A facsimile reception job or a print job is a job the user rarely wishes to cancel. For a facsimile transmission job, a job whose acceptance ranking is lower (whose management start time is later) is preferably checked quickly or with simple operation. This is because the user often wishes to find an error in the contents of work just after the work is complete, or in other words, the user usually finds an error in the contents of work unless he/she finds one just after completion of work. The Stop button 32c is often pressed when the user wishes to cancel reading of a manuscript. A facsimile 10 comprising a control unit 11 according to the embodiment operating in the above fashion functions as a unit on which the user can generally cancel a job with two operations or on which a procedure to cancel a job is made easier than that for an existing facsimile.

Second Embodiment

Figure 13:
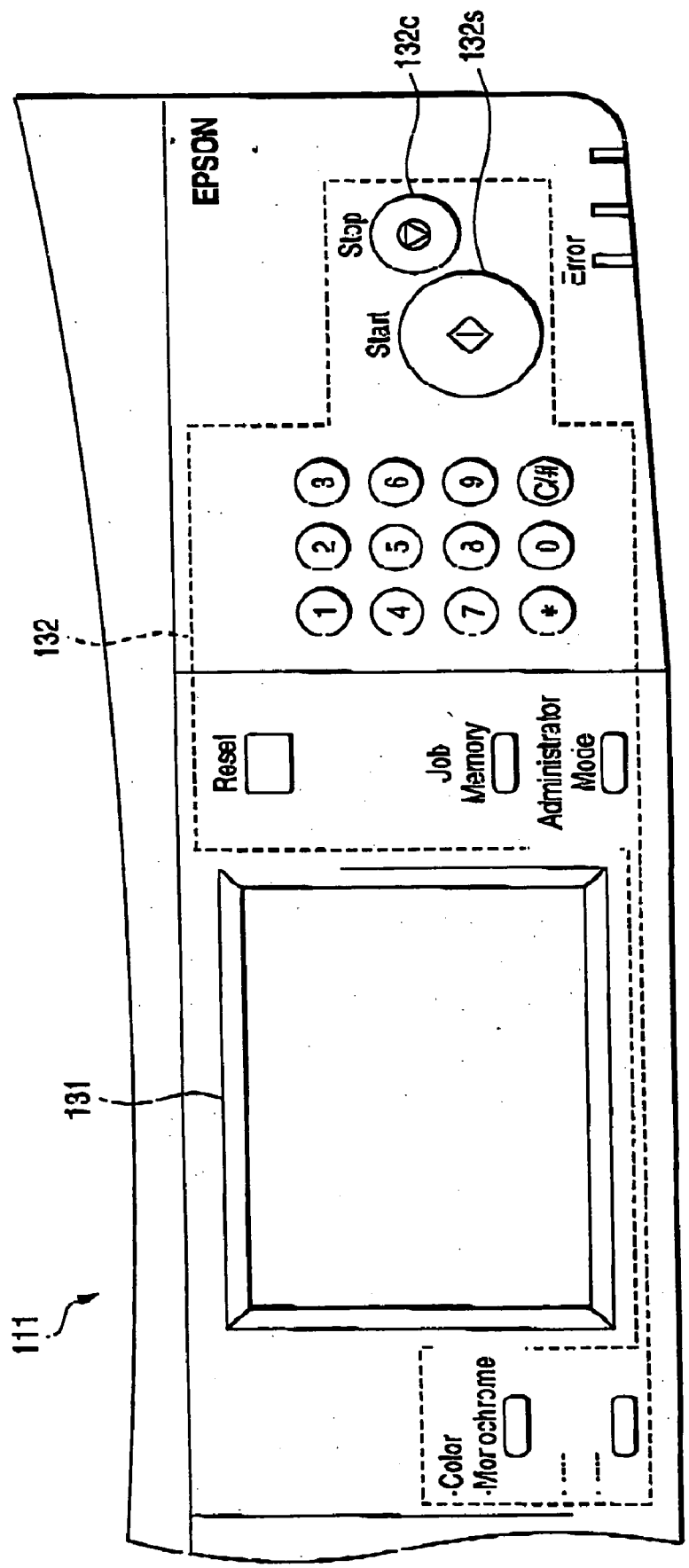
FIG. 13 is an external view of a control unit used for the information processing apparatus according to the second embodiment of the invention.
Figure 14:
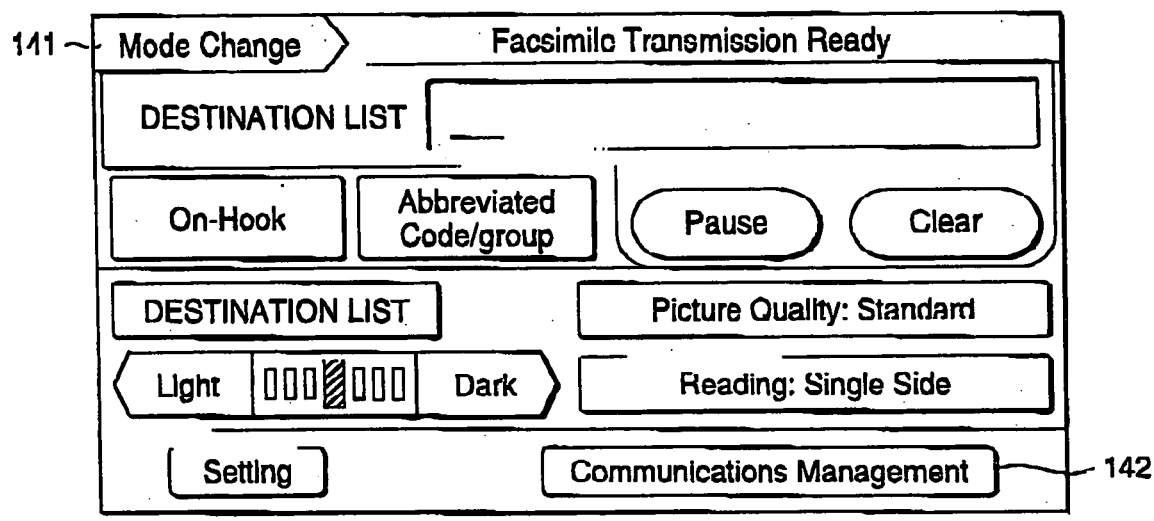
FIGS. 14A and 14B show screens displayed by the control unit according to the second embodiment.
Figure 14:
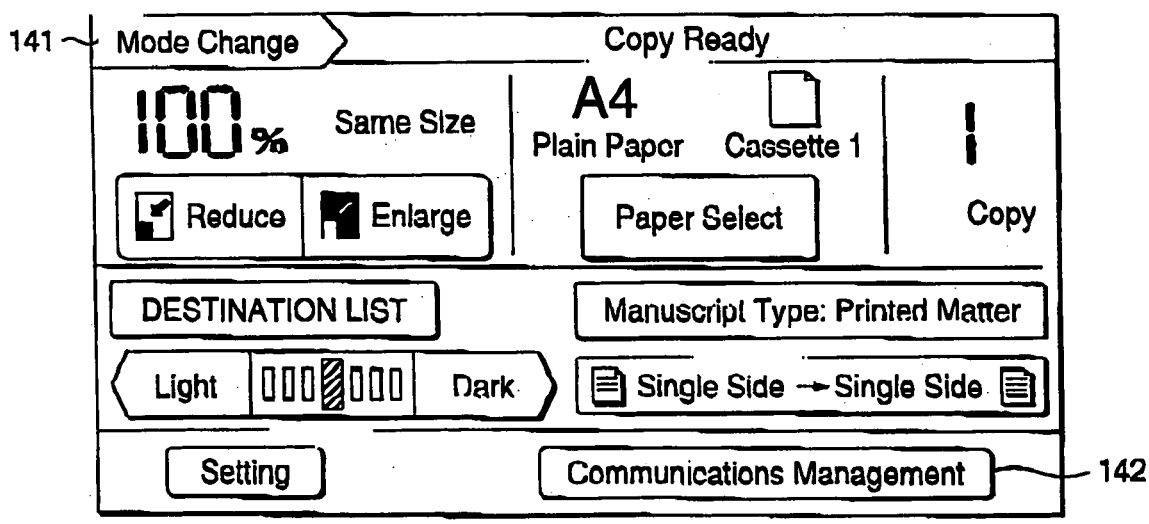

An information processing apparatus 110 according to a second embodiment of the invention is outlined below referring to FIGS. 12 through 14.

Figure 12:
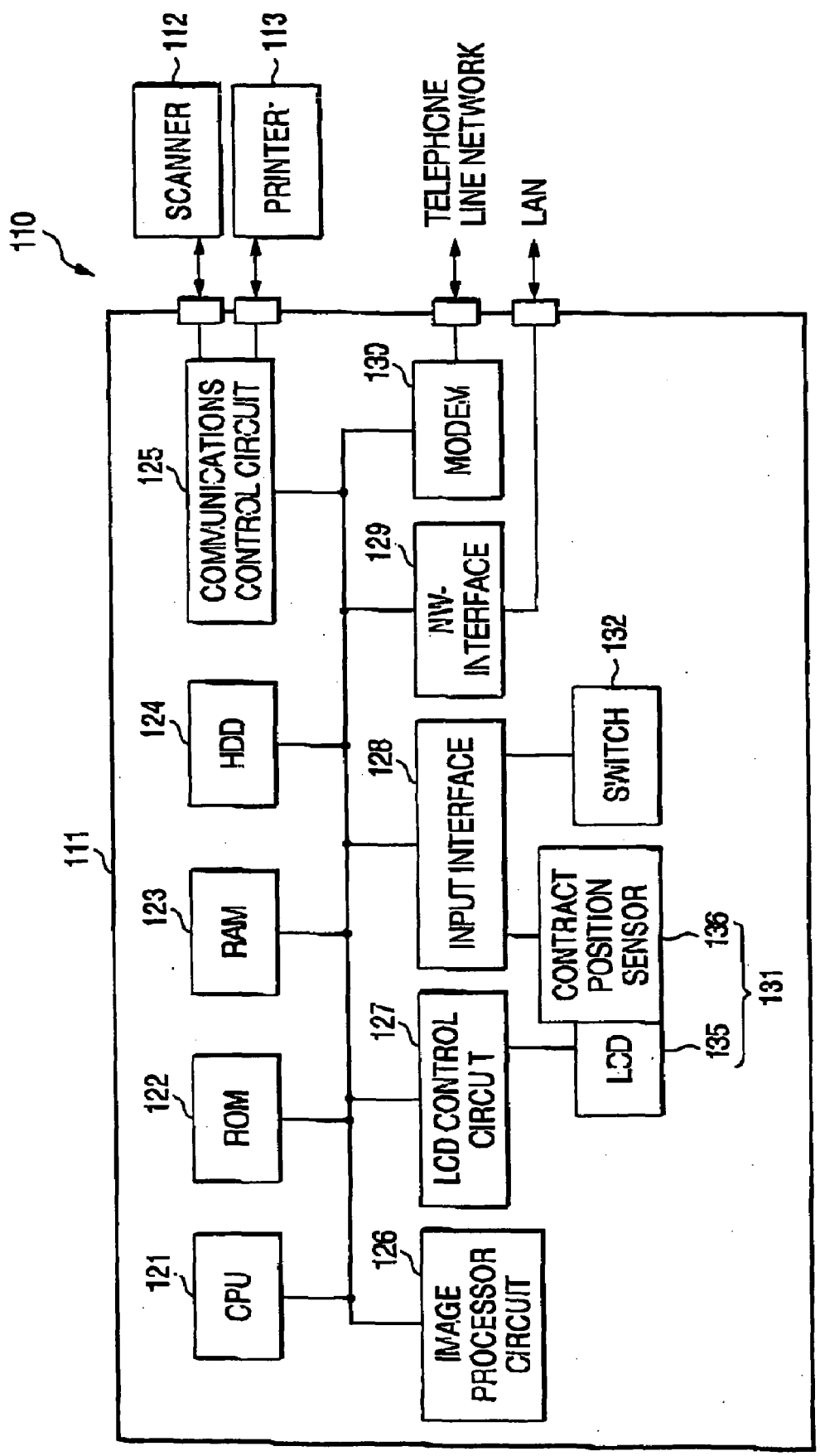
FIG. 12 is a block diagram of an information processing apparatus according to a second embodiment of the invention.

As shown in FIG. 12, the information processing apparatus 110 according to this embodiment is a combination of a control unit 111, a scanner 112 and a printer 113.

The scanner 112 and the printer 113 used for the information processing apparatus 110 are same as the scanner 12 and the printer 13 used for the facsimile 10 (see FIG. 1).

The control unit 111 comprises a CPU 121, a ROM 122, a RAM 123, an HDD 124, a communications control circuit 125, an image processor circuit 126, an LCD control circuit 127, an input interface circuit (input I/F) 128, a network interface circuit (NW-I/F) 129, a modem 130, a touch-sensitive screen 131, and a switch 132.

Each device of the control unit 111 is essentially the same as a device having the same name of the control unit 11. For example, the switch 132 is a unit comprising a Start button 132s and a Stop button 132c provided on the housing of the control unit 111.

In the ROM 122 of the control unit 111 according to this embodiment is stored a program different from that stored in the ROM 22 of the control unit 11 according to the first embodiment. The programs causes the control unit 111 to operate as a unit capable of executing a "read (copy)" job, a "print (copy)" job, a "read (network copy)" job, a "print (network copy)" job, a "read (scan to file)" job, a "read (scan to e-mail)" job, a "read (PC driver)" job, a "print (PC driver)" job, a "print (file to print)" job, a "read (facsimile)" job, a "transmission (facsimile)" job, a "reception (facsimile)" job, and a "print (facsimile)" job.

Each job is outlined below. In the following description, a job whose name contains "read" is represented as a read job. Image data generated by the scanner 111 is called scan data.

The "read (PC driver)" job causes the scanner 112 as a network scanner (causes a computer connected to a network to use the scanner 112). The "read (PC driver)" job is generated when a predetermined instruction is transmitted from a computer connected to a network.

Each read job except the "read (PC driver)" job (such as a "read (copy)" job and a "read (network copy)" job) causes the scanner 111 to generate scan data used for the purpose indicated by its name (such as copy and network copy). Each read job except the "read (PC driver)" job is generated when the Start button 132s is pressed (recognized as a job to be executed by the control unit 111).

In particular, the "read (facsimile)" job is generated when the Start button 132s is pressed in a state where the basic screen for facsimile shown in FIG. 14A is displayed on the touch-sensitive screen 131.

The "read (copy)" job is generated when the Start button 132s is pressed in a state where the basic screen for copy shown in FIG. 14B is displayed on the touch-sensitive screen 131 and the printer 113 is selected as a destination unit of copy results. The "read (network copy)" job is generated when the Start button 132s is pressed in a state where the basic screen for copy shown in FIG. 14D is displayed on the touch-sensitive screen 131 and the printer 113 of another information processing apparatus 110 connected via LAN to the control unit (information processing apparatus 110/control unit 111) is selected as a destination of copy results. The control unit 111 is a unit capable of selecting (specifying) a destination unit of copy results by pressing a "Paper Select" button on the basic screen for copy.

The "read (scan to file)" job is generated when the Start button 132s is pressed in a state where the basic screen for scan for specifying the destination of scan data (specifying a computer and a folder or an e-mail address) is displayed on the touch-sensitive screen 131 and a folder of a computer connected via LAN to the control unit (information processing apparatus 110/control unit 111) is specified as a destination of copy results. The "read (scan to e-mail)" job is generated when the Start button 132s is pressed in a state where the basic screen for scan is displayed on the touch-sensitive screen 131 and an e-mail address is specified as a destination of scan data.

Although not shown, the basic screen for scan used to issue an instruction to execute a job such as the "read (scan to file)" job has a Mode Switching button 141 and a "Communications Management" button 142 for starting the job information display processing (detailed later), same as the basic screen for facsimile and the basic screen for copy (see FIG. 14).

The "print (copy)" job executable by the control unit 111 is generated when the "read (copy)" job is terminated. When the "print (copy)" job is generated, the control unit 111, in case the printer 113 is ready for use (in case there are no waiting print jobs and the printer 113 is not used), starts processing to generate printed matter corresponding to the image data generated in the "read (copy)" job onto the printer 113. In case the printer 113 is not ready for use, the control unit 111 stores the "print (copy)" job as a job to be executed once other waiting print jobs are terminated, that is, queues the "print (copy)" job.

The "print (network copy)" job is generated when a "read (network copy)" job is terminated on another information processing apparatus 110 connected via LAN to the control unit (control unit 111), that is, when scan data is transmitted from another information processing apparatus 110. When the "print (network copy)" job is generated, the control unit 111, in case the printer 113 is ready for use, starts processing to generate printed matter corresponding to the received image data onto the printer 113. In case the printer 113 is not ready for use, the control unit 111 stores the "print (network copy)" job as a job to be executed once other waiting print jobs are terminated.

The "print (PC driver)" job causes the printer 113 to generate printed matter corresponding to print data transmitted from a computer connected via LAN to the control unit. The "print (file to print)" job causes the printer 113 to perform printing based on a file identified by a computer name and a file name given by a computer connected over a network. These jobs are immediately started in case the printer 113 is ready for use. In case the printer 113 is not ready for use, these jobs are queued.

The "transmission (facsimile)" job actually transmits via facsimile the scan data prepared by the "read (facsimile)" job. The "transmission (facsimile)" job is generated when the "read (facsimile)" job is complete. In case the modem 130 is not ready for use (in general, the model 130 is used for another "transmission (facsimile)" job or "reception (facsimile)" job, the "transmission (facsimile)" job generated is queued.

The "reception (facsimile)" job receives facsimile data transmitted to the control unit. The "print (facsimile)" job causes the printer 113 to generate printed matter corresponding to the facsimile data received by the "reception (facsimile)" job. The "print (facsimile)" job is queued in case the modem 130 is not ready for use when the job is generated, same as a job generated when the "reception (facsimile)" job is complete.

Based on the above, the configuration and operation of the information processing apparatus 110 according to this embodiment is described more specifically. In the following description, a job whose name contains "print" is represented as a print job.

The information processing apparatus 110 (control unit 111) is a unit operating in a state where a job information display order definition file is stored in the HDD 122 of the control unit 111.

As schematically shown in FIGS. 15 through 18, the job information display order definition file can store the display rank as numeric value information concerning each of a set of all types of read jobs (hereinafter referred to as the read job group), a #transmission (facsimile) job, and a "reception (facsimile)" job. The job information display order definition file has a configuration (format) to store a specified value of display order in a group "1" or "0" for each print job group and a "reception (facsimile)" job.

The control unit 111 of the information processing apparatus 110 is a unit configured (programmed) to use the job information display order definition file as described below. While the detailed description is omitted, the actual control unit 111 is a unit manufactured (shipped) in a state where the job information display order definition file and four model files shown in FIGS. 15 through 18 are stored in the HDD 122. The control unit 111 is also a unit configured to specify an arbitrary model file as a job information display order definition file (store a copy of a model file as a job information display order definition file) by operating a computer connected over a network to the control unit 111 and to modify the contents of the job information display order definition file.

When the power is turned on (or when the contents of the job information display order definition file is modified), the control unit 111 reads the contents of the job information display order definition file stored in the HDD 122 into a RAM. The contents of the job information display order definition file read into the RAM is hereinafter referred to as job information display order definition information.

Figure 19:
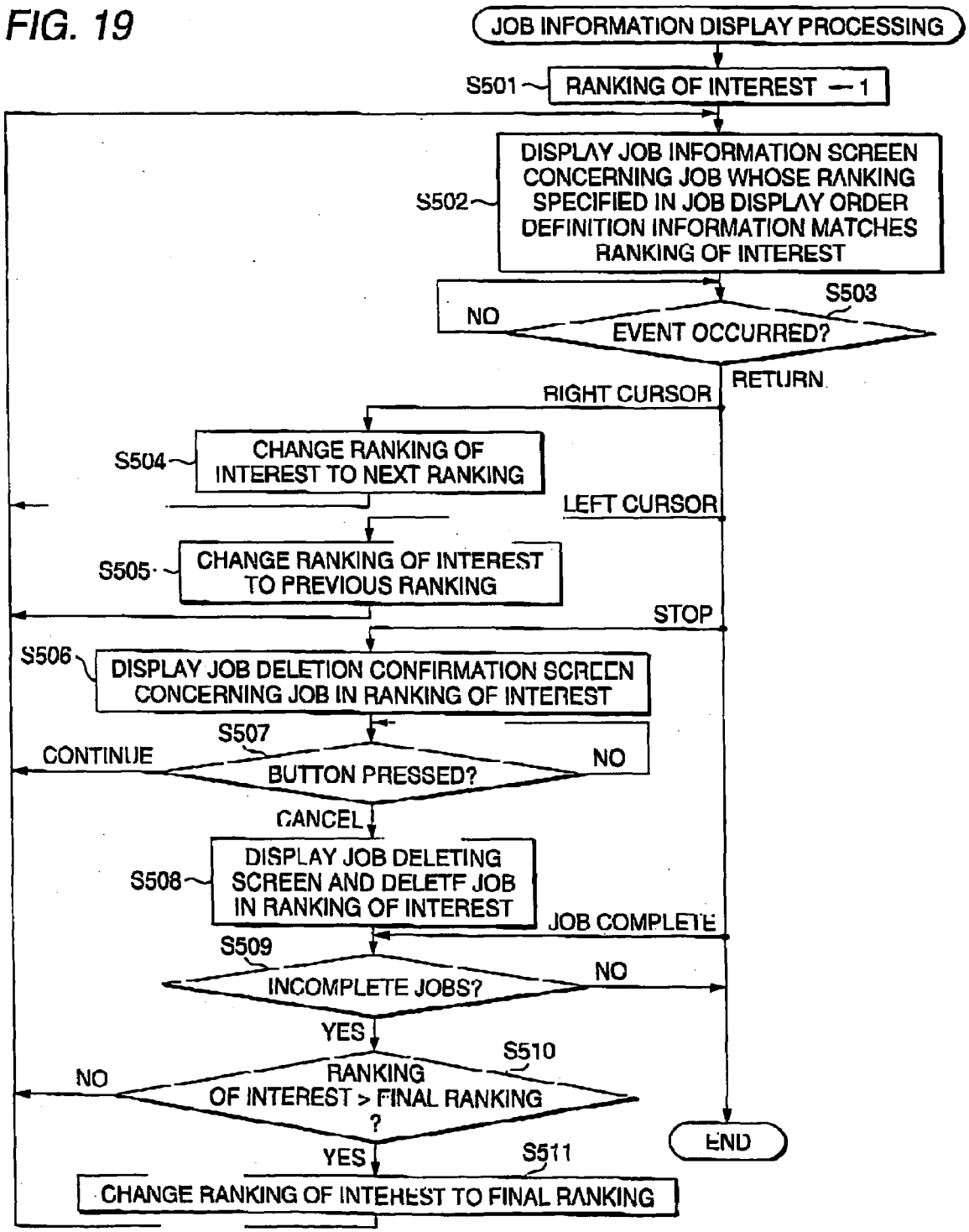
FIG. 19 is a flowchart of job information display processing executed by the control unit according to the second embodiment.

In case predetermined operation (hereinafter referred to as the job information display processing start instruction operation) starting with a push on the "Communications Management" 142 on the basic screen for facsimile (FIG. 14A), the basic screen for copy (FIG. 14B) and the basic screen for scan is made, the control unit 111 starts the job information display processing of the procedure shown in FIG. 19. In case a read job is generated, the control unit 111 starts the read job generated and also starts the job information display processing.

In case the job information display processing start instruction operation is made or a read job is generated, the control unit 111 stores the ranking of interest "1" (first ranking) in step 501 and displays on the touch-sensitive screen 131 a job information display screen concerning a job whose job ranking defined in the job information display order definition information matches the ranking of interest (step S502).

The job ranking defined in the job information display order definition information (hereinafter referred to simply as job ranking) is a ranking assigned to a display rank of the job information display order definition information in ascending order. The job ranking is a ranking assigned in the order in accordance with the corresponding specified value of display order in a group for a plurality of print jobs belonging to the same print job group and a plurality of "transmission (facsimile)" jobs (order of job generation time in case the specified value of display order in a group is "0" and inverse order of job generation time in case the specified value of display order in a group is "1").

The job information display screen is a screen shown in one of FIGS. 20A through 20D. The job information display screen displayed in FIG. 20A appears in case the job in the first job ranking is a "read (copy)" job. In other words, the job information display screen appears in case the job information display processing is started as a result of generation of a "read (copy)" job (in this case the read (copy)" job is a job in the first job ranking).

The job information display screen displayed in FIG. 20B appears in case the job in the first job ranking is a "read (scan to e-mail)" job (in case the job information display processing is started as a result of generation of a "read (scan to e-mail)" job). The job information display screens displayed in FIGS. 20C and 20D appear in case a job in the first ranking is a "print (copy)" job and a "print (PC driver)" job, respectively.

As assumed from these drawings, the job information display screen comprises an information display area 151 for displaying the contents of a job whose job ranking matches the ranking of interest (hereinafter referred to as the job in the ranking of interest), a left cursor button 152L, a right cursor button 152R, a job ranking/total count display area 153 for displaying the ranking of interest/total job count (such as "1/4" and "2/4"), and a "Return" button 154. On the job information display screen, in case the ranking of interest is "1", the left cursor button 152L is inactive (grayed out and does not respond when pressed). Although not shown, in case the ranking of interest matches the total job count, the right cursor button 152R on the job information display screen is inactive. Further, the job information display screens concerning a read job (see FIGS. 20A and 20B) comprises an area 151p for displayed the number of pages where read processing (image data generation) is complete and an inactive "Return" button 154.

Figure 20:
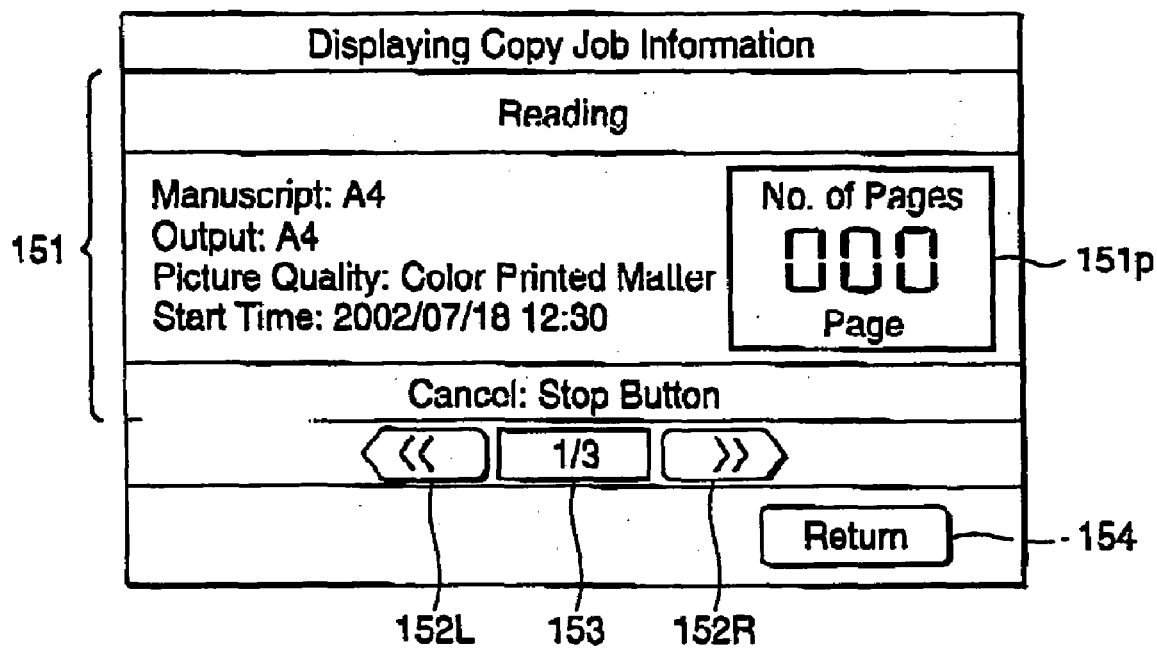
FIGS. 20A to 20D show the job information display screens displayed on the touch-sensitive screen while the job information display processing under way.
Figure 20:
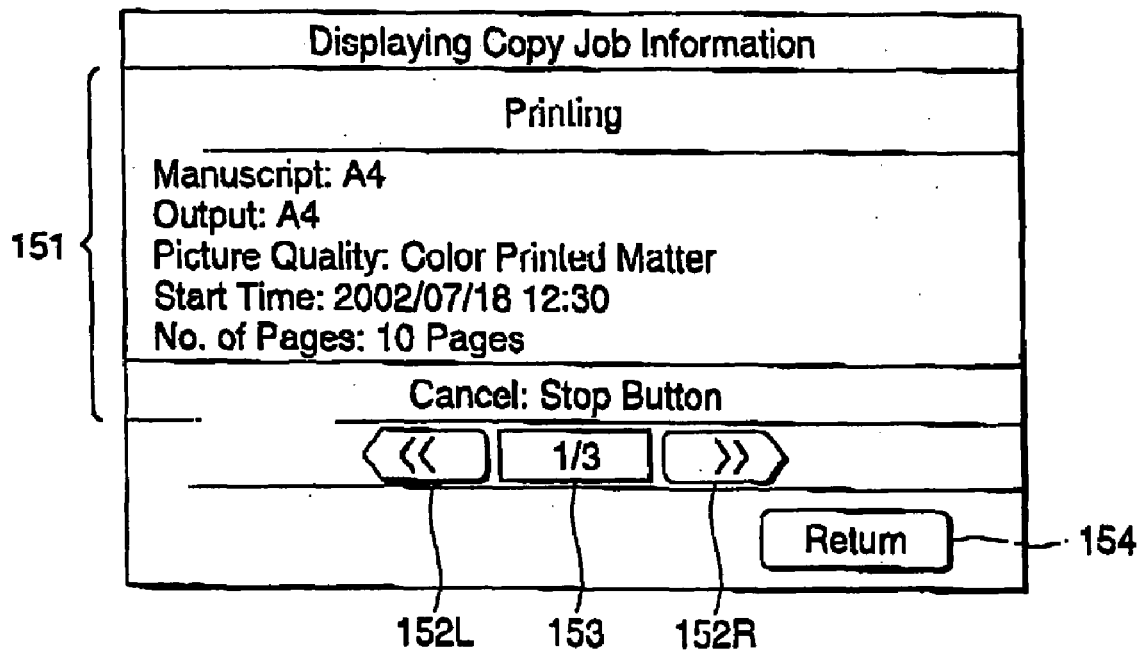
Figure 20:
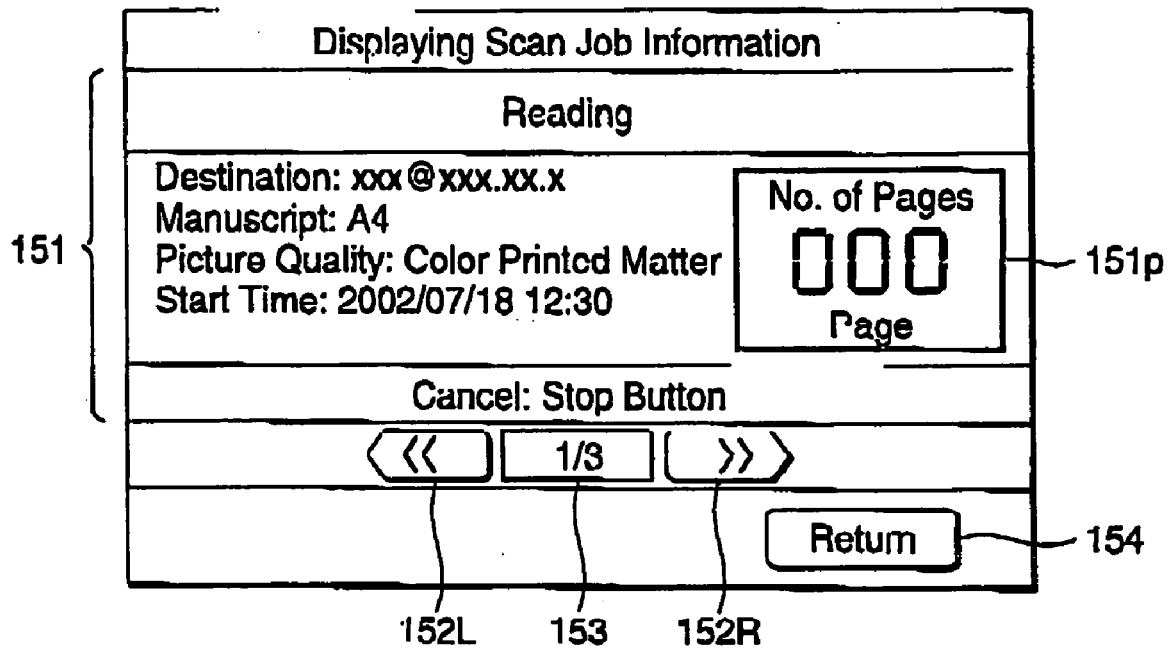
Figure 20:
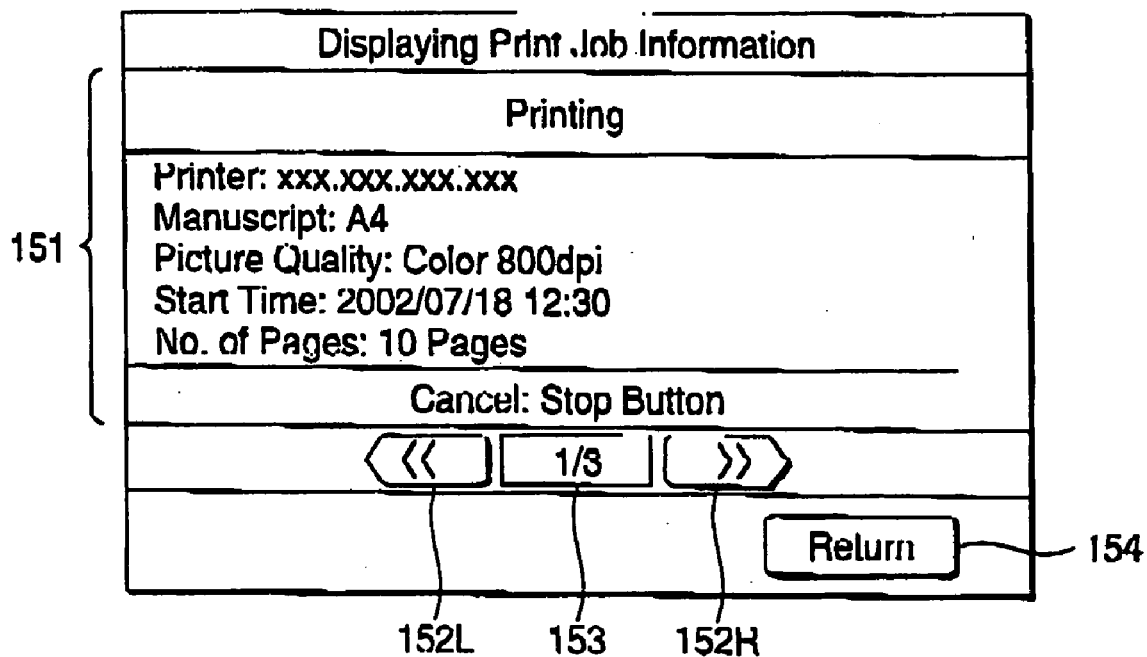

The control unit 111 which has displayed the job information display screen on the touch-sensitive screen 131 enters a state of monitoring a push on the button on the job information display screen displayed on the touch-sensitive screen 131, a push on the Stop button 132c and termination of a running job (FIG. 20: step S503).

In case the right cursor button 152R is pressed (step S503; Right cursor), the control unit 111 changes the ranking of interest to the next ranking (adds "1" to the ranking of interest) (step S504) and executes step S502 and the subsequent steps again. In case the left cursor button 152L is pressed (step S503; Left cursor), the control unit 111 changes the ranking of interest to the previous ranking (subtracts "1" from the ranking of interest) (step S505) and executes step S502 and the subsequent steps again.

In case the Stop button 132c is pressed (step S503; Stop), the control unit 111 displays the job deletion confirmation screen concerning the job in the ranking of interest (job whose ranking matches the ranking of interest) on the touch-sensitive screen 131 (step S506). The job deletion confirmation screen displayed in step S506 is a screen including a "Cancel" button and a "Continue" button as well as information indicating what job is to be canceled, same as the job deletion confirmation screen displayed by the control unit 11 according to the first embodiment (see FIG. 8).

The control unit 111 then enters a state of awaiting a push on the "Cancel" button or "Continue" button on the job deletion confirmation screen (step S507). In case the "Continue" button 62 is pressed (step S507; Continue), the control unit 111 executes step S502 and the subsequent steps. That is, the control unit 111 displays on the touch-sensitive screen 131 the same job information display screen as that displayed when the Stop button 132c is pressed and enters a state of awaiting various events such as operation by the user on the touch-sensitive screen 131.

In case the "Cancel" button on the job deletion confirmation screen is pressed (step S507; Cancel), the control unit 111 performs deletion of a job in the ranking of interest (step S508). When executing step S508, the control unit 111 displays on the touch-sensitive screen 131 the job deleting screen of the same configuration as the job deleting screen (FIG. 8B) displayed by the control unit 11 according to the first embodiment.

The control unit 111 then determines whether an incomplete job remains (step S509). In case an incomplete job remains (step S509; YES), the control unit 111 determines whether the ranking of interest at that point in time exceeds the final job ranking (total count of incomplete job) at that point in time (step S510). In case the ranking of interest does not exceed the final ranking (step S510; NO), the control unit 111 executes step S502 and the subsequent steps without changing the ranking of interest. In case the ranking of interest exceeds the final ranking (step S510; YES), the control unit 111 changes the ranking of interest to the final ranking (step S511) then executes step S502 and the subsequent steps.

In case there are no incomplete jobs (step S509; NO) as a result of job cancellation (deletion) in step S508 or the "Return" button 54 (active) on the job information display screen is pressed (step S503: Return), the control unit 111 terminates the job information display processing. The control unit 111 then displays a screen of the same type as that displayed just before start of the job information display processing.

In case a running job is terminated (step S503; Job complete), the control unit 111 executes step S509 and the subsequent steps described earlier. That is, in case there remain no incomplete jobs, the control unit 111 terminates the job information display processing. In case there remains an incomplete job, the control unit 111 changes the ranking of interest as required and changes the job information display screen on the touch-sensitive screen 131 to a screen reflecting the current state.

The control unit 111 according to this embodiment is a unit for executing such job information display processing and also a unit for starting processing to store the ranking of interest "1" (first ranking) in case the Stop button 132c is pressed in a state where the job information display processing is not under way (the basic screen for facsimile and the basic screen for copy are displayed on the touch-sensitive screen 131) as well as processing starting with step S506 of the job information display processing.

The control unit 111 is also a unit which operates in a similar way to the control unit 11 in case an error has taken place on which there is no way but delete a job (action to delete a job is the only solution). In case an error has taken place on which there is no way but cancel (delete) a job, the control unit 111 cancels (deletes) the job without making an inquiry to the user about whether to cancel the job. For an error which needs some action on the part of the user although the only action is to delete the job, the control unit 111 notifies the user of the completion of the action then cancels (deletes) the job.

As described hereinabove, the information processing apparatus 110 (the control unit 111) according to the second embodiment allows the user to check the contents of each running/waiting job without selecting the type of a job whose information is to be displayed. Thus, the information processing apparatus 110 functions as a unit on which checkup of the contents of each running/waiting job is made easier than a related art multifunction machine. Further, the information processing apparatus 110 is a unit capable of changing the display order to match the use environment (a unit capable of modifying the contents of a job information display order definition file). Using the information processing apparatus 110 provides an office environment whereby various tasks are performed more efficiently.

In case a plurality of facsimile transmission jobs are present, the control unit 11 presents the contents of the facsimile transmission jobs in inverse order of management start time of each facsimile transmission job. In case a plurality of print jobs are present, the control unit 11 presents the contents of the print jobs in inverse order of management start time of each print job.

As described hereinabove, in case the user has pressed the Stop button 132c in order to cancel a job while a read job is under way, an information processing apparatus 110 (control unit 111) according to the second embodiment selects the read job as a job to be canceled (a job to be displayed on the job cancellation confirmation screen).

A facsimile reception job or a print job is a job the user rarely wishes to cancel. A facsimile 10 according to the invention comprising a control unit 11 operating in the above fashion functions as a unit on which the user can generally cancel a job with two operations or on which a procedure to cancel a job is made easier than that for an existing facsimile.

Variation

Modifications may be made to the facsimile 10 according to the first embodiment and the information processing apparatus according to the second embodiment. For example, while the facsimile 10 functions as three types of unit, the facsimile 10 may function as a facsimile only or may function as a facsimile and copier. The information processing apparatus 110 may be a unit capable of executing jobs at different types from those mentioned above.

While the facsimile 10 (information processing apparatus 110) comprises three units (a control unit 11, a scanner 12 and a printer 13), the functions equivalent to those of the facsimile 10 and the information processing apparatus 110 may be implemented on a single unit or four or more units (for example three units which function as a copier when combined and a unit for adding the facsimile function to the unit comprising the three units).

The facsimile 10 and the information processing apparatus 110 may be implemented by providing several pushbuttons instead of the contact position sensors 36, 136. The particular contents of various screens displayed on the facsimile 10 and the information processing apparatus 110 may be different from those mentioned above.

What is claimed is:

1. A facsimile comprising:
   a display unit;
   an input unit;
   a facsimile control section for executing, in parallel, jobs including:
      a read job for generating facsimile data based on a manuscript to be transmitted via facsimile;
      a facsimile transmission job for transmitting facsimile data to a specified facsimile destination;
      a facsimile reception job for receiving and storing transmitted facsimile data; and
      a print job for printing facsimile data received and stored by the facsimile reception job; and
   a cancellation instruction acceptance section for executing an instruction input await processing for awaiting an operation on the input unit in a state where information to prompt input of an instruction on whether to cancel an arbitrary job managed as a running or waiting job by the facsimile control section is displayed on the display unit, wherein
   one of jobs is selected by way of a predetermined algorithm from the running or waiting jobs by the facsimile control section when the button on the input unit is pressed to cancel the job,
   the cancellation instruction acceptance section executes the instruction input await processing on the selected job, and the predetermined algorithm used by the cancellation instruction acceptance section is an algorithm whereby in case the facsimile control section is executing the read job, the read job is selected, whereby in case the facsimile control section is not executing the read job and the facsimile control section is managing the facsimile transmission job as a running or waiting job, the facsimile transmission job is selected, and whereby in case the facsimile control section is not executing the read job and the facsimile control section is not managing a facsimile transmission job as a running or waiting job, but managing the print job as a running or waiting job, the print job is selected.

2. The facsimile according to claim 1, wherein the predetermined algorithm used by the cancellation instruction acceptance section is an algorithm whereby in case information concerning the job managed as the running or waiting job by the facsimile control section is displayed on the display unit, the job is selected.

3. The facsimile according to claim 1, wherein the instruction input await processing executed by the cancellation instruction acceptance section changes a target job when a predetermined operation is made on the input unit.

4. The facsimile according to claim 1, wherein the facsimile control section cancels the job without making an inquiry to the user about whether to cancel the job in case a job must be canceled.

5. A facsimile comprising:
a display unit;
an input unit;
a facsimile control section for executing, in parallel, jobs including:
a read job for generating facsimile data based on a manuscript to be transmitted via facsimile;
a facsimile transmission job for transmitting facsimile data to a specified facsimile destination;
a facsimile reception job for receiving and storing transmitted facsimile data; and
a print job for printing facsimile data received and stored by the facsimile reception job; and
a cancellation instruction acceptance section for executing an instruction input await processing for awaiting an operation on the input unit in a state where information to prompt input of an instruction on whether to cancel an arbitrary job managed as a running or waiting job by the facsimile control section is displayed on the display unit, wherein
one of jobs is selected by way of a predetermined algorithm from the running or waiting jobs by the facsimile control section when the button on the input unit is pressed to cancel the job,
the cancellation instruction acceptance section executes the instruction input await processing on the selected job,
the facsimile control section manages a plurality of the facsimile transmission jobs and a plurality of the print jobs, and
the predetermined algorithm used by the cancellation instruction acceptance section is an algorithm whereby in case the facsimile control section is executing the read job, the read job is selected, whereby in case the facsimile control section is not executing the read job and the facsimile control section is managing one or more facsimile transmission jobs as one or more running or waiting jobs, the facsimile transmission job whose management start time by the facsimile control section is the latest is selected, and whereby in case the facsimile control section is not executing a read job and the facsimile control section is not managing a facsimile transmission job as a running or waiting job, but managing one or more print jobs as one or more running or waiting jobs, a print job whose management start time by the facsimile control section is the earliest is selected.

6. The facsimile according to claim 5, wherein the predetermined algorithm used by the cancellation instruction acceptance section is an algorithm whereby in case information concerning the job managed as the running or waiting job by the facsimile control section is displayed on the display unit, the job is selected.

7. The facsimile according to claim 5, wherein the instruction input await processing executed by the cancellation instruction acceptance section changes a target job when a predetermined operation is made on the input unit.

8. The facsimile according to claim 5, wherein the facsimile control section cancels the job without making an inquiry to the user about whether to cancel the job in case a job must be canceled.

9. An information processing apparatus comprising:
a display unit;
an input unit;
a job execution section for executing a plurality of jobs in parallel, and
a cancellation instruction acceptance section for executing an instruction input await processing for awaiting an operation on the input unit in a state where information to prompt input of an instruction on whether to cancel each job being executed by the job execution section and each job to be executed by the job execution section is displayed on the display unit, wherein
the job is selected by way of a predetermined algorithm from the jobs being executed by the job execution section and the jobs to be executed by the job execution section when a predetermined button provided on the input unit is pressed to cancel the job,
the cancellation instruction acceptance section starts the instruction input await processing on the selected job,
the job execution section executes:
a read job for generating image data of a manuscript by using a scanner,
a facsimile transmission job for transmitting facsimile data to a specified facsimile destination,
a facsimile reception job for receiving and storing transmitted facsimile data, and
a print job for printing facsimile data generated by the read job and facsimile data received by the facsimile reception job
the predetermined algorithm used by the cancellation instruction acceptance section is an algorithm whereby in case the job execution section is executing the read job, the read job is selected, whereby in case the job execution section is not executing the read job and the job execution section is managing the facsimile transmission job as a running or waiting job, the facsimile transmission job is selected, and whereby in case the job execution section is not executing the read job and the job execution section is not managing a facsimile transmission job as a running or waiting job, but managing the print job as a running or waiting job, the print job is selected.

* * * * *